(12) United States Patent
DeMuth et al.

(10) Patent No.: US 11,718,568 B2
(45) Date of Patent: Aug. 8, 2023

(54) ADDITIVE MANUFACTURING, BOND MODIFYING SYSTEM AND METHOD

(71) Applicant: Seurat Technologies, Inc., Mountain View, CA (US)

(72) Inventors: James A. DeMuth, Woburn, MA (US); Erik Toomre, Los Altos, CA (US)

(73) Assignee: Seurat Technologies, Inc., Wilmington, MA (US)

( * ) Notice: Subject to any disclaimer, the term of this patent is extended or adjusted under 35 U.S.C. 154(b) by 122 days.

(21) Appl. No.: 17/479,826

(22) Filed: Sep. 20, 2021

(65) Prior Publication Data

US 2022/0001574 A1     Jan. 6, 2022

Related U.S. Application Data

(63) Continuation of application No. 15/419,555, filed on Jan. 30, 2017, now Pat. No. 11,148,319.

(Continued)

(51) Int. Cl.
| | |
|---|---|
| *C04B 35/573* | (2006.01) |
| *B22F 10/28* | (2021.01) |
| *B22F 12/42* | (2021.01) |
| *B22F 12/43* | (2021.01) |
| *B22F 12/44* | (2021.01) |
| *B22F 12/45* | (2021.01) |
| *B33Y 50/02* | (2015.01) |
| *B28B 1/00* | (2006.01) |
| *B22F 12/49* | (2021.01) |

(Continued)

(52) U.S. Cl.
CPC ............ *C04B 35/573* (2013.01); *B22F 10/28* (2021.01); *B22F 12/42* (2021.01); *B22F 12/43* (2021.01); *B22F 12/44* (2021.01); *B22F 12/45* (2021.01); *B28B 1/001* (2013.01); *B33Y 50/02* (2014.12); *B22F 12/49* (2021.01); *B33Y 10/00* (2014.12); *B33Y 30/00* (2014.12); *C04B 2235/6026* (2013.01); *C04B 2235/665* (2013.01); *Y02P 10/25* (2015.11)

(58) Field of Classification Search
CPC ......... B28B 1/001; B33Y 10/00; B33Y 30/00; B33Y 70/00; B33Y 50/02; B22F 3/1055; B22F 10/20; B22F 10/00; Y02P 10/29; Y02P 10/292; Y02P 10/295; C04B 2235/6026; C04B 2235/665
See application file for complete search history.

(56) References Cited

U.S. PATENT DOCUMENTS

| | | | |
|---|---|---|---|
| 5,980,813 A | * 11/1999 | Narang ................ | B33Y 10/00 264/494 |
| 8,290,818 B1 | 10/2012 | Levitan et al. | |

(Continued)

FOREIGN PATENT DOCUMENTS

WO     WO-2015167530 A2 *  11/2015  ........... B29C 64/165

*Primary Examiner* — Joseph S Del Sole
*Assistant Examiner* — Jamel M Nelson
(74) *Attorney, Agent, or Firm* — David R. Stevens; Stevens Law Group

(57) ABSTRACT

An additive manufacturing system including a two-dimensional energy patterning system for imaging a powder bed is disclosed. The two-dimensional energy patterning system may be used to control a state of matter of each successive additive layer. Accordingly, the system may be used to alter the chemical bond arrangement of the material forming the various additive layers.

15 Claims, 17 Drawing Sheets

Related U.S. Application Data

(60) Provisional application No. 62/288,765, filed on Jan. 29, 2016.

(51) Int. Cl.
 *B33Y 10/00* (2015.01)
 *B33Y 30/00* (2015.01)

(56) References Cited

U.S. PATENT DOCUMENTS

| | | |
|---|---|---|
| 2003/0152756 A1 | 8/2003 | Yamada et al. |
| 2007/0087284 A1 | 4/2007 | Fleming et al. |
| 2010/0290016 A1 | 11/2010 | Kaehr et al. |
| 2014/0356472 A1 | 12/2014 | Oberhofer et al. |
| 2015/0076739 A1 | 3/2015 | Batchelder |

\* cited by examiner

ADDITIVE MANUFACTURING, BOND MODIFYING SYSTEM AND METHOD

CROSS-REFERENCE TO RELATED PATENT APPLICATION

This application is a continuation of U.S. patent application Ser. No. 15/419,555, filed Jan. 30, 2017, which claims the benefit of U.S. Patent Application No. 62/288,765, filed on Jan. 29, 2016, both of which are hereby incorporated by reference in their entirety.

TECHNICAL FIELD

The present disclosure relates generally to a system and method for additive manufacture and, more particularly, powder bed fusion using two-dimensional energy patterning to both print and overcome one or more activation energy barriers.

BACKGROUND

Traditional component machining often relies on removal of material by drilling, cutting, or grinding to form a part. In contrast, additive manufacturing, also referred to as three-dimensional (3D) printing, typically involves sequential layer-by-layer addition of material to build a part. In view of the current state of the art in 3D printing, what is needed are systems and methods for smooth and efficient manufacturing of printed parts.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

An additive manufacturing system may include one or more energy sources, including in one embodiment, one or more laser or electron beams, positioned to emit one or more energy beams. Beam shaping optics may receive the one or more energy beams from the energy source and form a single beam. An energy patterning unit may receive or generate the single beam and transfer a two-dimensional pattern to the beam, and may reject the unused energy not in the pattern. An image relay may receive the two-dimensional patterned beam and focus it as a two-dimensional image to a desired location on a height fixed or movable build platform (e.g., a powder bed). In certain embodiments, some or all of any rejected energy from the energy patterning unit may be reused.

In some embodiments, multiple beams from the laser array(s) may be combined using a beam homogenizer. This combined beam can be directed at an energy patterning unit that includes either a transmissive or reflective pixel addressable light valve. In one embodiment, the pixel addressable light valve includes both a liquid crystal module having a polarizing element and a light projection unit providing a two-dimensional input pattern. The two-dimensional image focused by the image relay can be sequentially directed toward multiple locations on a powder bed to build a 3D structure.

Figure 1A:
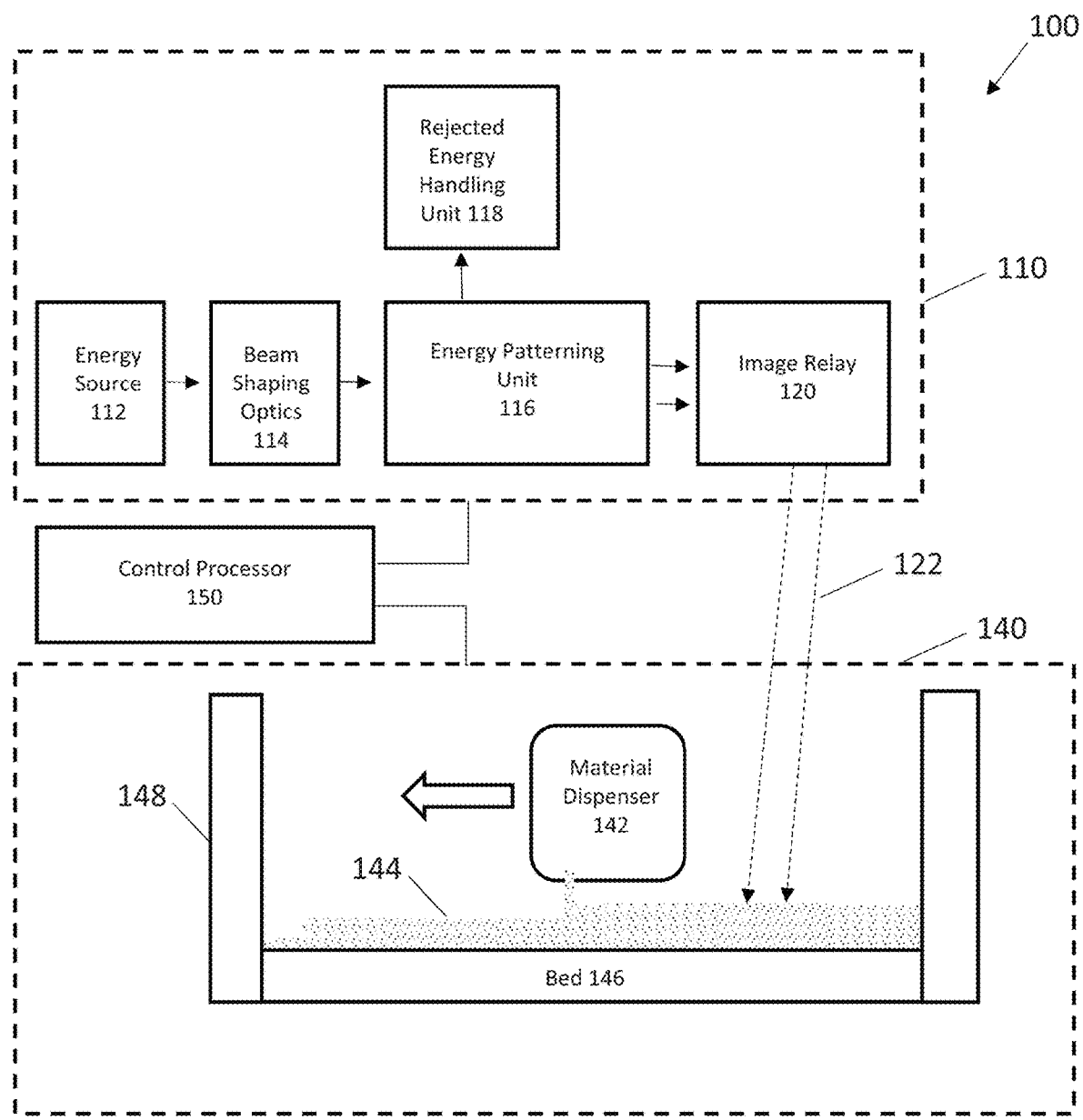
FIG. 1A illustrates an additive manufacturing system.

As seen in FIG. 1, an additive manufacturing system 100 may have an energy patterning system 110 with an energy source 112 that can direct one or more continuous or intermittent energy beam(s) toward beam shaping optics 114. After shaping, if necessary, the beam may be patterned by an energy patterning unit 116, with generally some energy being directed to a rejected energy handling unit 118. Patterned energy may be relayed by image relay 120 toward an article processing unit 140, typically as a two-dimensional image 122 focused near a bed 146. The bed 146 (with optional walls 148) can form a chamber containing material 144 dispensed by material dispenser 142. Patterned energy, directed by the image relay 120, can melt, fuse, sinter, amalgamate, change crystal structure, influence stress patterns, or otherwise chemically or physically modify the dispensed material 144 to form structures with desired properties.

An energy source 112 may generate photon (light), electron, ion, or other suitable energy beams or fluxes capable of being directed, shaped, and patterned. Multiple energy sources can be used in combination. The energy source 112 can include lasers, incandescent light, concentrated solar, other light sources, electron beams, or ion beams. Possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/$MnCl_2$) vapor laser.

A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:$YVO_4$) laser, Neodymium doped yttrium calcium oxoborateNd:$YCa_4O(BO_3)^3$ or simply Nd:YCOB, Neodymium glass(Nd:Glass) laser, Titanium sapphire(Ti:sapphire) laser, Thulium YAG (Tm:YAG) laser, Ytterbium YAG (Yb:YAG) laser, Ytterbium:$2O_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass(147$Pm^{+3}$:Glass) solid-state laser, Chromium doped chrysoberyl (alexandrite) laser, Erbium doped anderbium-ytterbium co-doped glass lasers, Trivalent uranium doped calcium fluoride (U:$CaF_2$) solid-state laser, Divalent samarium doped calcium fluoride(Sm:$CaF_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

For example, in one embodiment a single Nd:YAG q-switched laser can be used in conjunction with multiple semiconductor lasers. In another embodiment, an electron beam can be used in conjunction with an ultraviolet semiconductor laser array. In still other embodiments, a two-dimensional array of lasers can be used. In some embodiments with multiple energy sources, pre-patterning of an energy beam can be done by selectively activating and deactivating energy sources.

A beam shaping unit 114 may include a great variety of imaging optics to combine, focus, diverge, reflect, refract, homogenize, adjust intensity, adjust frequency, or otherwise shape and direct one or more energy beams received from the energy source 112 toward the energy patterning unit 116. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

An energy patterning unit 116 may include static or dynamic energy patterning elements. For example, photon, electron, or ion beams can be blocked by masks with fixed or movable elements. To increase flexibility and ease of image patterning, pixel addressable masking, image generation, or transmission can be used. In some embodiments, the energy patterning unit may include addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In yet another embodiment, an electron patterning device receives an address pattern from an electrical or photon stimulation source and generates a patterned emission of electrons.

A rejected energy handling unit 118 may be used to disperse, redirect, or utilize energy not patterned and passed through the energy pattern image relay 120. In one embodiment, the rejected energy handling unit 118 can include passive or active cooling elements that remove heat from the energy patterning unit 116. In other embodiments, the rejected energy handling unit can include a "beam dump" to absorb and convert to heat any beam energy not used in defining the energy pattern. In still other embodiments, rejected beam energy can be recycled using beam shaping optics 114. Alternatively, or in addition, rejected beam energy can be directed to the article processing unit 140 for heating or further patterning. In certain embodiments, rejected beam energy can be directed to additional energy patterning systems or article processing units.

An image relay 120 may receive a patterned image (typically a two-dimensional image) from the energy patterning unit 116 and guide it toward the article processing unit 140. In a manner similar to beam shaping optics 114, the image relay 120 can include optics to combine, focus, diverge, reflect, refract, adjust intensity, adjust frequency, or otherwise shape and direct the patterned image.

An article processing unit 140 may include a walled chamber 148 and bed 146, and a material dispenser 142 for distributing material. The material dispenser 142 can distribute, remove, mix, provide gradations or changes in material type or particle size, or adjust layer thickness of material. The material may include metal, ceramic, glass, polymeric powders, other melt-able material capable of undergoing a thermally induced phase change from solid to liquid and back again, or combinations thereof. The material may further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 146.

In addition to material handling components, the article processing unit 140 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals).

A control processor 150 may be connected to control any components of additive manufacturing system 100. The control processor 150 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 150 may be provided with an interface to allow input of manufacturing instructions. Use of a wide range of sensors allows various feedback control mechanisms that improve quality, manufacturing throughput, and energy efficiency.

Figure 1B:
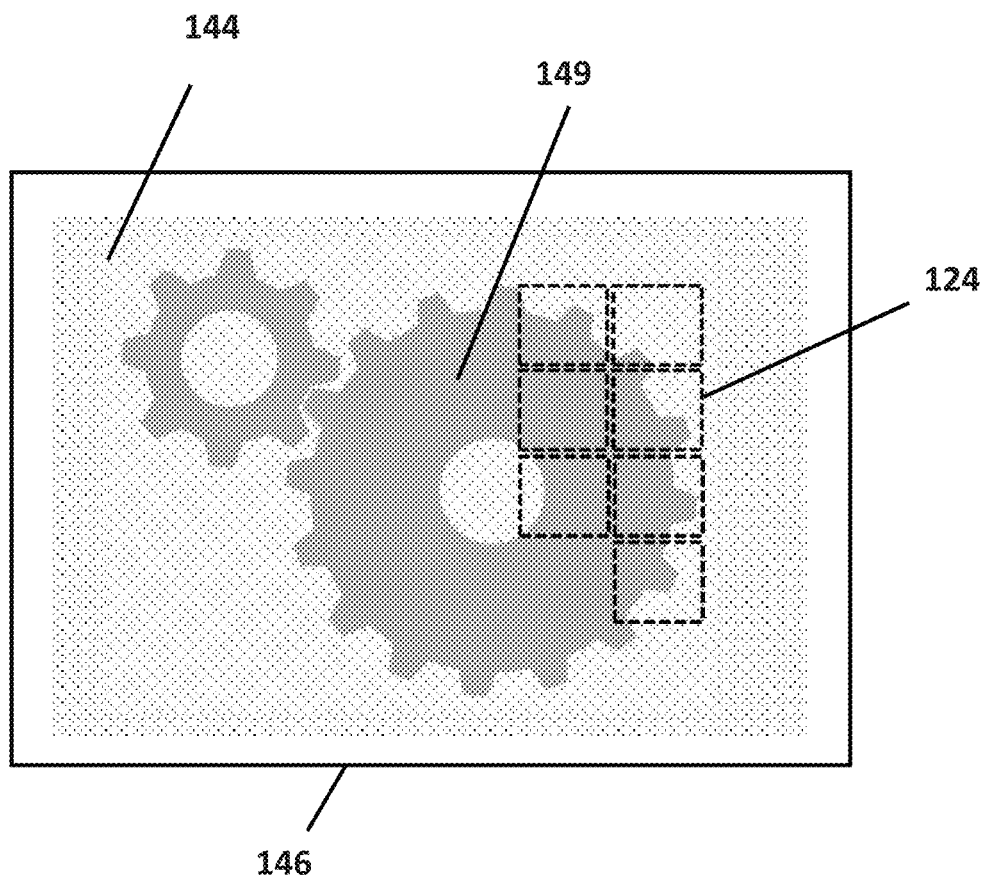
FIG. 1B is a top view of a structure being formed on an additive manufacturing system.

FIG. 1B is a schematic drawing illustrating a bed 146 that supports material 144.

Using a series of sequentially applied, two-dimensional patterned energy beam images (squares in dotted outline 124), a structure 149 may be additively manufactured. As will be understood, image patterns having non-square boundaries can be used, overlapping or interpenetrating images can be used, and images can be provided by two or more energy patterning systems. In other embodiments, images can be formed in conjunction with directed electron or ion beams, or with printed or selective spray systems.

Figure 2:
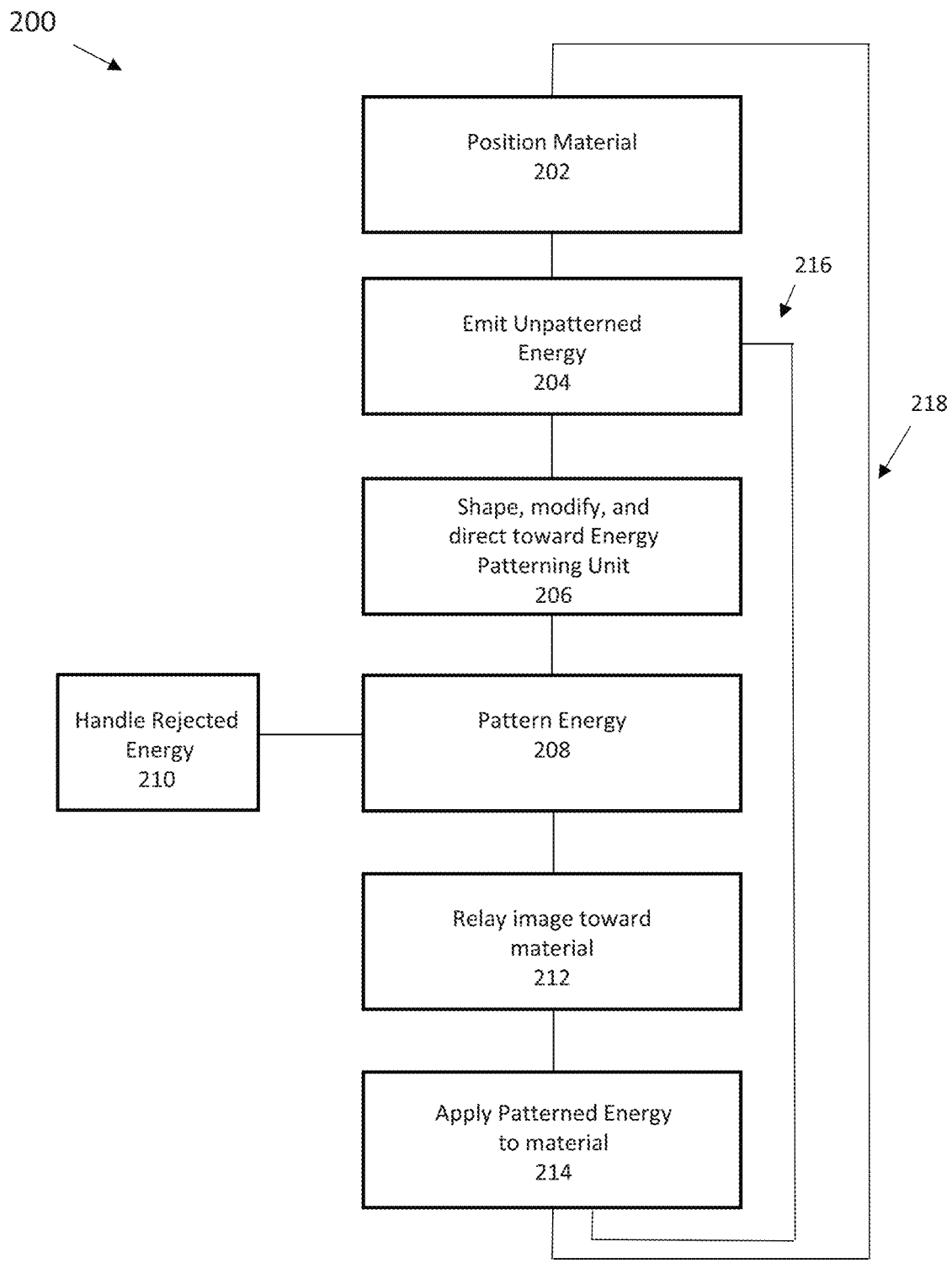
FIG. 2 illustrates an additive manufacturing method.

FIG. 2 is a flow chart illustrating one embodiment of an additive manufacturing process supported by the described optical and mechanical components. In step 202, material may be positioned in a bed, chamber, or other suitable support. The material can be a powder capable of being melted, fused, sintered, induced to change crystal structure, have stress patterns influenced, or otherwise chemically or physically modified to form structures with desired properties.

In step 204, unpatterned energy may be emitted by one or more energy emitters, including but not limited to solid state or semiconductor lasers, or electrical power supply flowing electrons down a wire. In step 206, the unpatterned energy may be shaped and modified (e.g. intensity modulated or focused). In step 208, this unpatterned energy may be patterned, with energy not forming a part of the pattern being handled in step 210 (this can include conversion to waste heat, or recycling as patterned or unpatterned energy). In step 212, the patterned energy, now forming a two-dimensional image may be relayed toward the material. In step 214, the image may be applied to the material, building a portion of a 3D structure. These steps can be repeated (loop 218) until the image (or different and subsequent image) has been applied to all necessary regions of a top layer of the material. When application of energy to the top layer of the material is finished, a new layer can be applied (loop 216) to continue building the 3D structure. These process loops are continued until the 3D structure is complete, when remaining excess material can be removed or recycled.

Figure 3A:
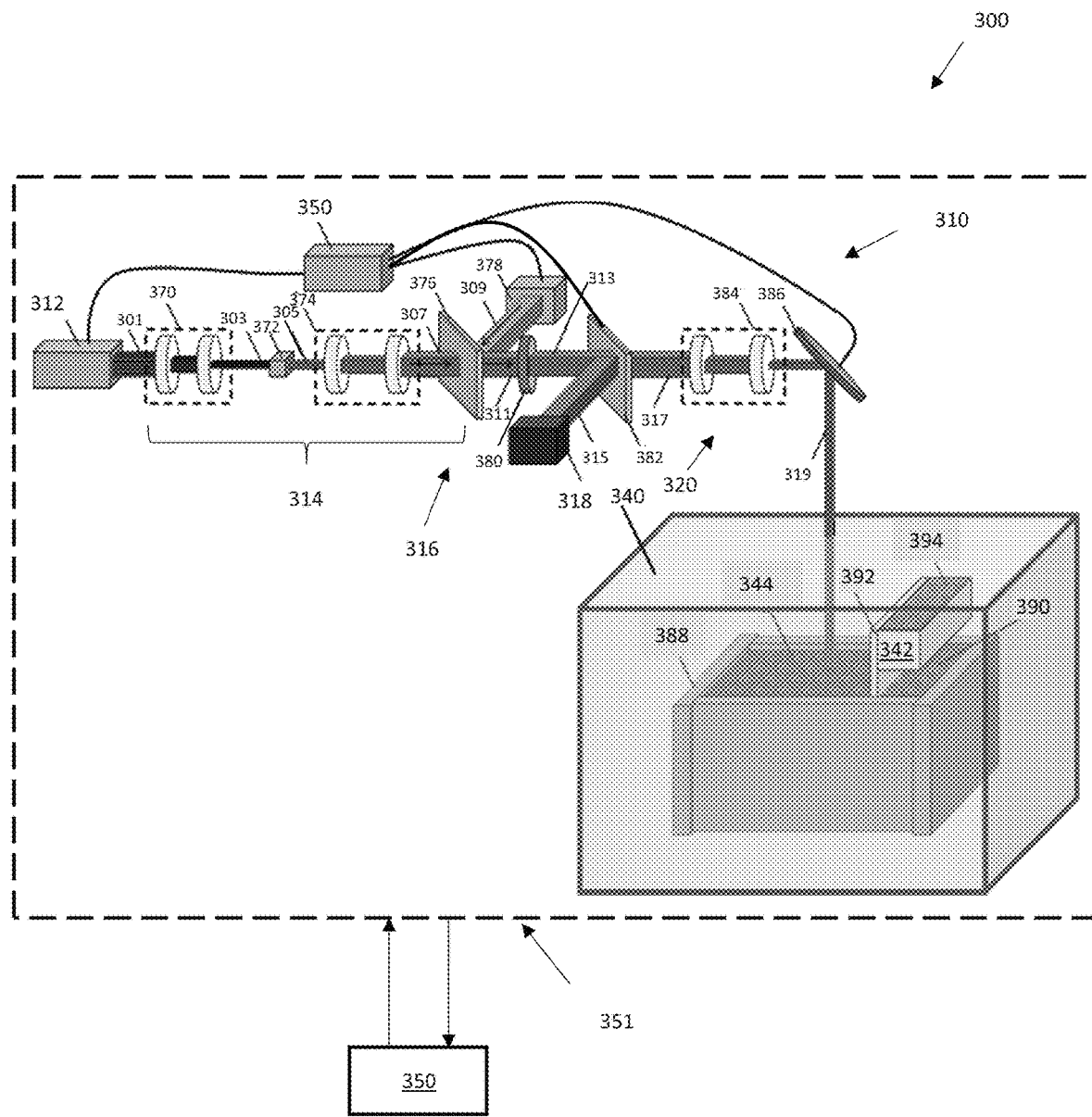
FIG. 3A is a schematic drawing illustrating an additive manufacturing system including lasers.

FIG. 3A is one embodiment of an additive manufacturing system 300 that uses multiple semiconductor lasers as part of an energy patterning system 310. A control processor 350 can be connected to variety of sensors, actuators, heating or cooling systems, monitors, and controllers to coordinate operation of multiple lasers 312, light patterning unit 316, and image relay 320, as well as any other component of system 300. These connections are generally indicated by a dotted outline 351 surrounding components of system 300. As will be appreciated, connections can be wired or wireless, continuous or intermittent, and include capability for feedback (for example, thermal heating can be adjusted in response to sensed temperature). The multiple lasers 312 can emit a beam 301 of light at a 1000 nm wavelength that, for example, is 90 mm wide by 20 mm tall. The beam 301 may be resized by imaging optics 370 to create beam 303. Beam 303 may be 6 mm wide by 6 mm tall, and may be incident on light homogenization device 372 which blends light together to create blended beam 305. Beam 305 may then be incident on imaging assembly 374 which reshapes the light into beam 307 and may then be incident on hot cold mirror 376. The mirror 376 allows 1000 nm light to pass, but may reflect 450 nm light. A light projector 378 capable of projecting low power light at 1080p pixel resolution and 450 nm emits beam 309, which may then be incident on hot cold mirror 376. Beams 307 and 309 overlay in beam 311, and both may be imaged onto optically addressed light valve 380 in, for example, a 20 mm wide, 20 mm tall image. Images formed from the homogenizer 372 and the projector 378 may be recreated and overlaid on light valve 380.

The optically addressed light valve 380 may be stimulated by the light (typically ranging from 400-500 nm) and may imprint a polarization rotation pattern in transmitted beam 313 which may be incident upon polarizer 382. The polarizer 382 may split the two polarization states, transmitting p-polarization into beam 317 and reflecting s-polarization into beam 315 which may then be sent to a beam dump 318 that handles the rejected energy. As will be understood, in other embodiments the polarization could be reversed, with s-polarization formed into beam 317 and reflecting p-polarization into beam 315. Beam 317 may enter the final imaging assembly 320 which includes optics 384 that resize the patterned light. This beam may reflect off of a movable mirror 386 to beam 319, which may terminate in a focused image applied to material bed 344 in an article processing unit 340. The depth of field in the image may be selected to span multiple layers, providing optimum focus in the range of a few layers of error or offset.

The bed 390 can be raised or lowered (vertically indexed) within chamber walls 388 that contain material 344 dispensed by material dispenser 342. In certain embodiments, the bed 390 can remain fixed, and optics of the final imaging assembly 320 can be vertically raised or lowered. Material distribution may be provided by a sweeper mechanism 392 that can evenly spread powder held in hopper 394, being able to provide new layers of material as needed. An image 6 mm wide by 6 mm tall can be sequentially directed by the movable mirror 386 at different positions of the bed.

When using a powdered ceramic or metal material in this additive manufacturing system 300, the powder can be spread in a thin layer, approximately 1-3 particles thick, on top of a base substrate (and subsequent layers) as the part is built. When the powder is melted, sintered, or fused by a patterned beam 319, it may amalgamate with the underlying layer, creating a solid structure. The patterned beam 319 can be operated in a pulsed fashion at 40 Hz, moving to the subsequent 6 mm×6 mm image locations at intervals of 10 ms to 0.5 ms (with 3 to 0.1 ms being desirable) until the selected patterned areas of powder have been melted. The bed 390 may then lower itself by a thickness corresponding to one layer, and the sweeper mechanism 392 may spread a new layer of powdered material. This process may be repeated until the 2D layers have built up the desired 3D structure. In certain embodiments, the article processing unit 340 can have a controlled atmosphere. This allows reactive materials to be manufactured in an inert gas, or vacuum environment without the risk of oxidation or chemical reaction, or fire or explosion (if reactive metals are used).

Figure 3B:
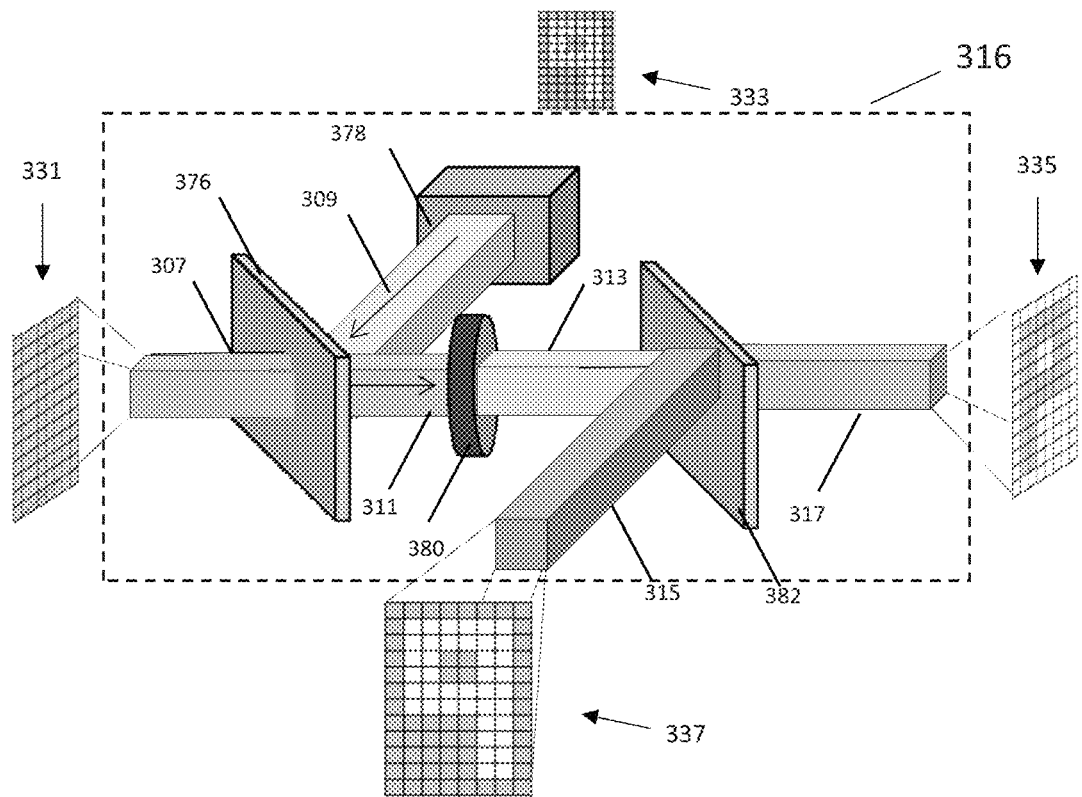
FIG. 3B is a detailed description of the light patterning unit shown in FIG. 3A.

FIG. 3B illustrates in more detail operation of the light patterning unit 316 of FIG. 3A. As seen in FIG. 3B, a representative input pattern 333 (here seen as the numeral "9") may be defined in an 8×12 pixel array of light projected as beam 309 toward mirror 376. Each grey pixel represents a light filled pixel, while white pixels are unlit. In practice, each pixel can have varying levels of light, including light-free, partial light intensity, or maximal light intensity. Unpatterned light 331 that forms beam 307 may be directed and passes through a hot/cold mirror 376, where it combines with patterned beam 309. After reflection by the hot/cold mirror 376, the patterned light beam 311 formed from overlay of beams 307 and 309 in beam 311, and both may be imaged onto optically addressed light valve 380. The optically addressed light valve 380, which would rotate the polarization state of unpatterned light 331, may be stimulated by the patterned light beam 309, 311 to selectively not rotate the polarization state of polarized light 307, 311 in the pattern of the numeral "9" into beam 313. The unrotated light representative of pattern 333 in beam 313 may then be allowed to pass through polarizer mirror 382 resulting in beam 317 and pattern 335. Polarized light in a second rotated state may be rejected by polarizer mirror 382, into beam 315 carrying the negative pixel pattern 337 consisting of a light-free numeral "9".

Other types of light valves can be substituted or used in combination with the described light valve. Reflective light valves, or light valves base on selective diffraction or refraction can also be used. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning. For electron beam patterning, these valves may selectively emit electrons based on an address location, thus imbuing a pattern on the beam of electrons leaving the valve.

Figure 3C:
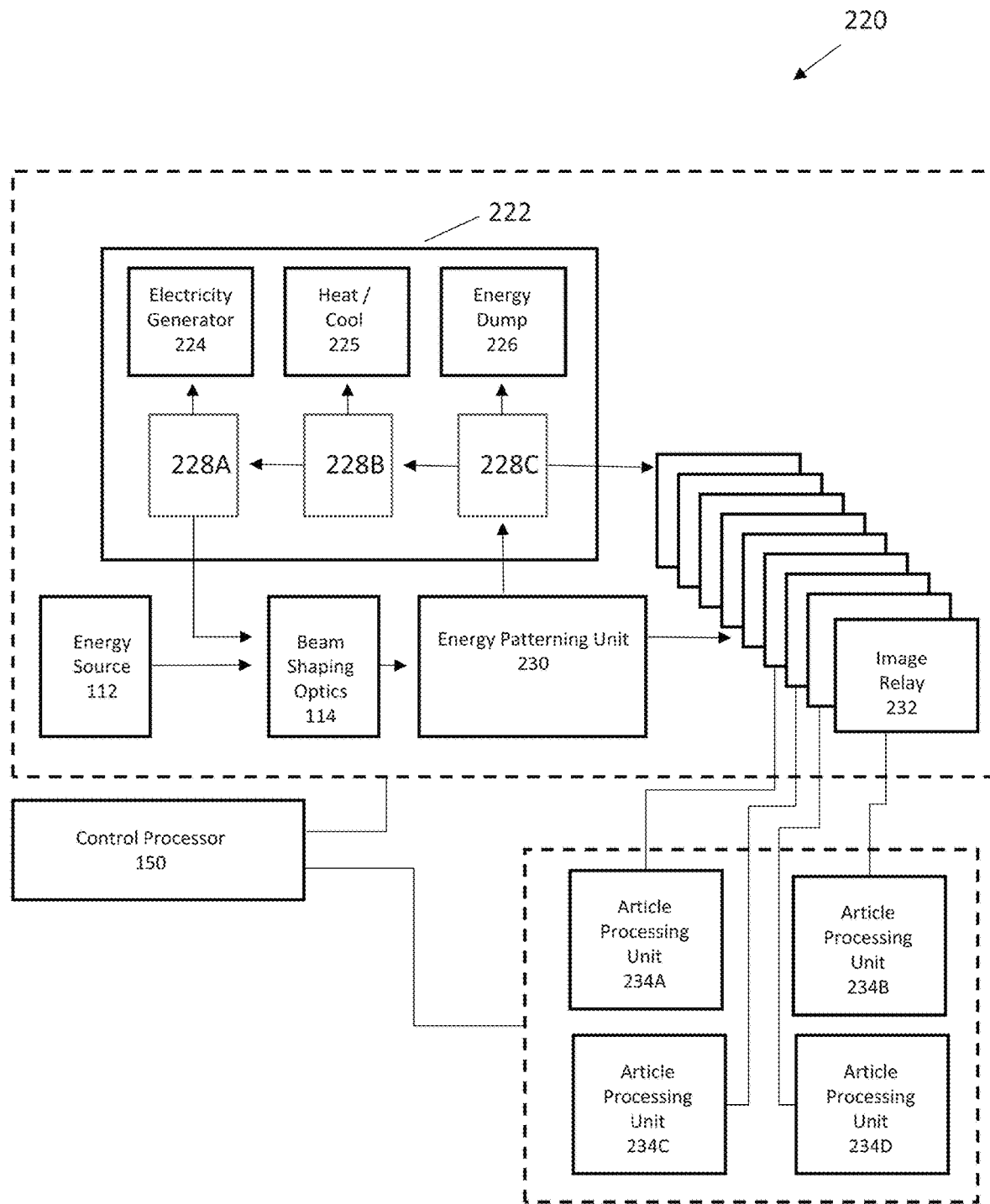
FIG. 3C is one embodiment of an additive manufacturing system with a "switchyard" for directing and repatterning light using multiple image relays.

FIG. 3C is one embodiment of an additive manufacturing system that includes a switchyard system enabling reuse of patterned two-dimensional energy. Similar to the embodiment discussed with respect to FIG. 1A, an additive manufacturing system 220 has an energy patterning system with an energy source 112 that directs one or more continuous or intermittent energy beam(s) toward beam shaping optics 114. After shaping, the beam may be two-dimensionally patterned by an energy patterning unit 230, with generally some energy being directed to a rejected energy handling unit 222. Patterned energy may be relayed by one of multiple image relays 232 toward one or more article processing units 234A, 234B, 234C, or 234D, typically as a two-dimensional image focused near a movable or fixed height bed. The bed (with optional walls) can form a chamber containing material dispensed by material dispenser. Patterned energy, directed by the image relays 232, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Relays 228A, 228B, and 22C can respectively transfer energy to an electricity generator 224, a heat/cool thermal management system 225, or an energy dump 226. Optionally, relay 228C can direct patterned energy into the image relay 232 for further processing. In other embodiments, patterned energy can be directed by relay 228C, to relay 228B and 228A for insertion into the energy beam(s) provided by energy source 112. Reuse of patterned images may also be possible using image relay 232. Images can be redirected, inverted, mirrored, sub-patterned, or otherwise transformed for distribution to one or more article processing units. 234A-D. Advantageously, reuse of the patterned light can improve energy efficiency of the additive manufacturing process, and in some cases improve energy intensity directed at a bed, or reduce manufacture time.

Figure 3D:
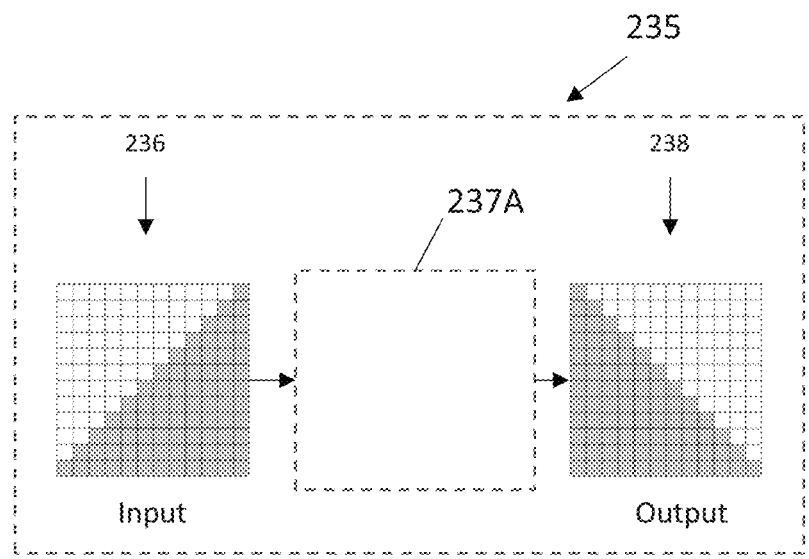
FIG. 3D illustrates a simple mirror image pixel remapping.

FIG. 3D is a schematic drawing 235 illustrating a simple geometrical transformation of a rejected energy beam for reuse. An input pattern 236 may be directed into an image relay 237 capable of providing a mirror image pixel pattern 238. As will be appreciated, more complex pixel transformations are possible, including geometrical transformations, or pattern remapping of individual pixels and groups of pixels. Instead of being wasted in a beam dump, this remapped pattern can be directed to an article processing unit to improve manufacturing throughput or beam intensity.

Figure 3E:
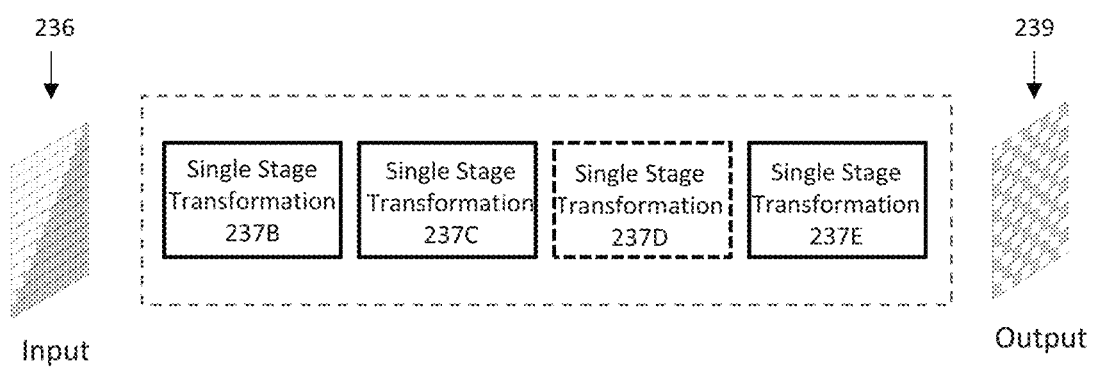
FIG. 3E illustrates a series of image transforming image relays for pixel remapping.

FIG. 3E is a schematic drawing 235 illustrating multiple transformations of a rejected energy beam for reuse. An input pattern 236 may be directed into a series of image relays 237B-E capable of providing a pixel pattern 238.

Figure 3F:
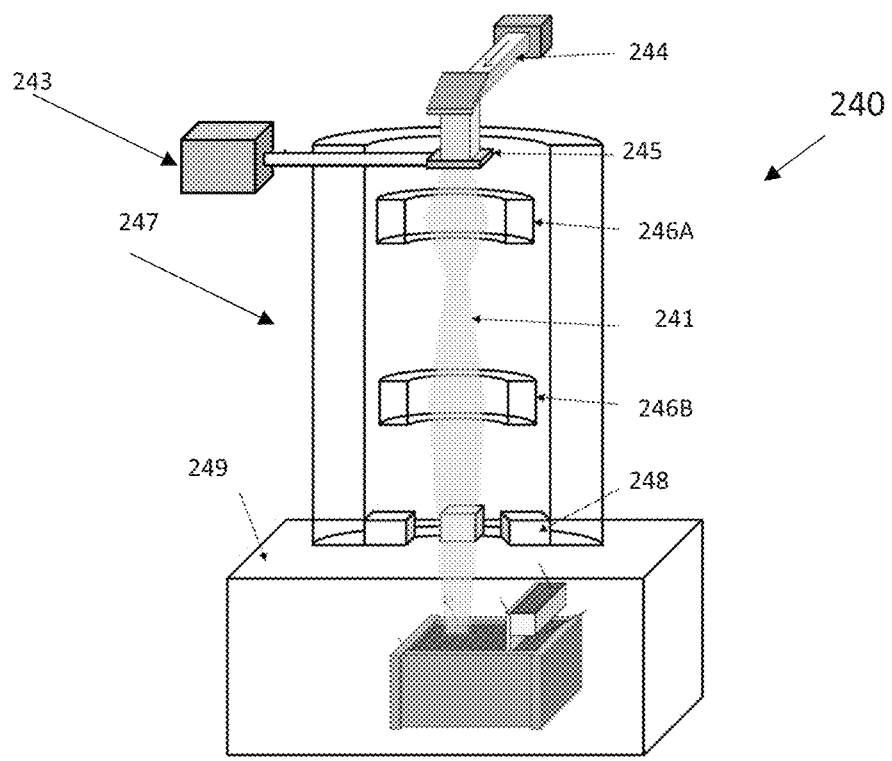
FIG. 3F illustrates an patternable electron energy beam additive manufacturing system.
Figure 3G:
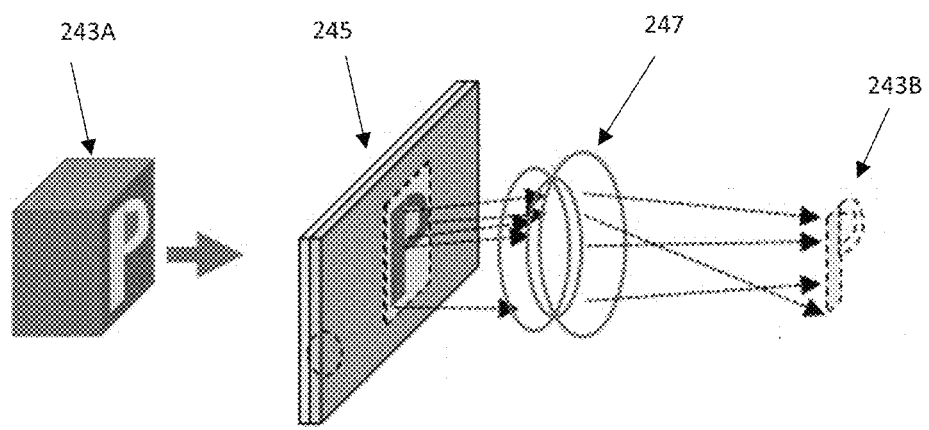
FIG. 3G illustrates a detailed description of the electron beam patterning unit shown in FIG. 3F FIG. 4A-C illustrate various beam combining embodiments.

FIGS. 3F and 3G illustrates a non-light based energy beam system 240 that includes a patterned electron beam 241 capable of producing, for example, a "P" shaped pixel image. A high voltage electricity power system 243 may be connected to an optically addressable patterned cathode unit 245. In response to application of a two-dimensional patterned image by projector 244, the cathode unit 245 may be stimulated to emit electrons wherever the patterned image is optically addressed. Focusing of the electron beam pattern may be provided by an image relay system 247 that includes imaging coils 246A and 246B. Final positioning of the patterned image may be provided by a deflection coil 248 that is able to move the patterned image to a desired position on a bed of additive manufacturing component 249.

In another embodiment supporting light recycling and reuse, multiplex multiple beams of light from one or more light sources may be provided. The multiple beams of light may be reshaped and blended to provide a first beam of light. A spatial polarization pattern may be applied on the first beam of light to provide a second beam of light. Polarization states of the second beam of light may be split to reflect a third beam of light, which may be reshaped into a fourth beam of light. The fourth beam of light may be introduced as one of the multiple beams of light to result in a fifth beam of light. In effect, this or similar systems can reduce energy costs associated with an additive manufacturing system. By collecting, beam combining, homogenizing and re-introducing unwanted light rejected by a spatial polarization valve or light valve operating in polarization modification mode, overall transmitted light power can potentially be unaffected by the pattern applied by a light valve. This advantageously results in an effective re-distribution of the light passing through the light valve into the desired pattern, increasing the light intensity proportional to the amount of area patterned.

Combining beams from multiple lasers into a single beam is one way to increasing beam intensity. In one embodiment, multiple light beams, each having a distinct light wavelength, can be combined using either wavelength selective mirrors or diffractive elements. In certain embodiments, reflective optical elements that are not sensitive to wavelength dependent refractive effects can be used to guide a multiwavelength beam.

Patterned light can be directed using movable mirrors, prisms, diffractive optical elements, or solid state optical systems that do not require substantial physical movement. In one embodiment, a magnification ratio and an image distance associated with an intensity and a pixel size of an incident light on a location of a top surface of a powder bed can be determined for an additively manufactured, three-dimensional (3D) print job. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto the location of the top surface of the powder bed. Translational movements of compensating gantries and the build platform gantry may also be able to ensure that distance of the incident light from the precursor mirror to the location of the top surface of the powder bed may be substantially equivalent to the image distance. In effect, this enables a quick change in the optical beam delivery size and intensity across locations of a build area for different powdered materials while ensuring high availability of the system.

In certain embodiments, a plurality of build chambers, each having a build platform to hold a powder bed, can be used in conjunction with multiple optical-mechanical assemblies arranged to receive and direct the one or more incident energy beams into the build chambers. Multiple chambers allow for concurrent printing of one or more print jobs inside one or more build chambers. In other embodiments, a removable chamber sidewall can simplify removal of printed objects from build chambers, allowing quick exchanges of powdered materials. The chamber can also be equipped with an adjustable process temperature controls.

In another embodiment, one or more build chambers can have a build chamber that may be maintained at a fixed height, while optics are vertically movable. A distance between final optics of a lens assembly and a top surface of powder bed a may be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the build platform are not needed. Typically, build chambers intended for metal powders with a volume more than ~0.1-0.2 cubic meters (i.e.,  greater than 100-200 liters or heavier than 500-1,000 kg) will most benefit from keeping the build platform at a fixed height.

In one embodiment, a portion of the layer of the powder bed may be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

Improved powder handling can be another aspect of an improved additive manufacturing system. A build platform supporting a powder bed can be capable of tilting, inverting, and shaking to separate the powder bed substantially from the build platform in a hopper. The powdered material forming the powder bed may be collected in a hopper for reuse in later print jobs. The powder collecting process may be automated, and vacuuming or gas jet systems also used to aid powder dislodgement and removal Some embodiments of the disclosed additive manufacturing system can be configured to easily handle parts longer than an available chamber. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) may be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having a 3D printer contained within an enclosure, the printer able to create a part having a weight greater than or equal to 2,000 kilograms. A gas management system may maintain gaseous oxygen within the enclosure at concentrations below the atmospheric level. In some embodiments, a wheeled vehicle may transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time in a powder bed fusion additive manufacturing system. An ingester system may be used for in-process collection and characterizations of powder samples. The collection may be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

Figure 4A:
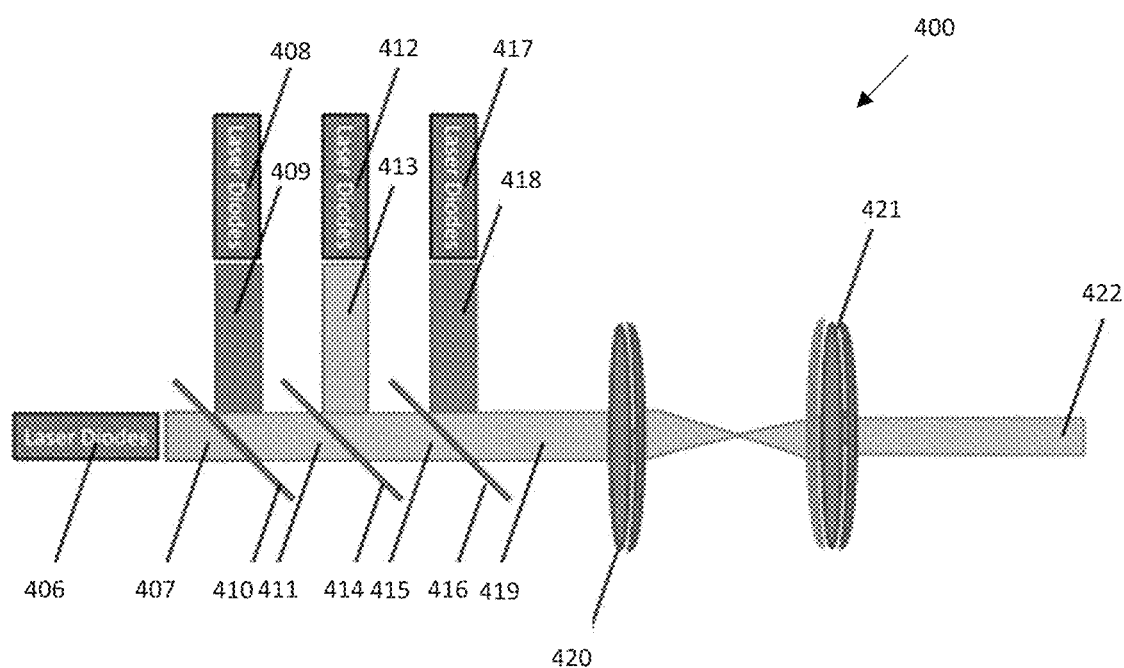

FIG. 4A illustrates a beam combining system 400 having multiple wavelength semiconductor lasers and using transmissive imaging optics. As will be understood, the discussed laser powers and wavelengths are exemplary, as are the selected wavelengths reflected or transmitted by wavelength filters. With the appropriate changes in positioning and use of wavelength filters, greater or lesser numbers of lasers can be used. In certain embodiments, solid state lasers can be substituted or used in combination with semiconductor lasers. In other embodiments, other laser types such as discussed with respect to FIG. 1, including gas, chemical, or metal vapor lasers can be used. In one embodiment, recycling and reuse of rejected light can substitute for a laser. Rejected light available in an additive manufacturing system can be collected, homogenized and re-introduced into a beam line. Advantageously, recycling and re-using rejected light can increase beam intensity and reduce energy costs associated with the system.

In FIG. 4A, semiconductor lasers of a first wavelength (1020 nm) 406 emit a 33.3 kW beam of photons of a corresponding wavelength 407, semiconductor lasers of a second wavelength (1000 nm) 408 emit a 33.3 kW beam of photons of the corresponding wavelength 409, which may then be combined using a wavelength filter 410 that transmits 1020 nm photons, but reflects 1000 nm photons. This results in a combined two-wavelength beam 411 of 66.6 kW. Semiconductor lasers of a third wavelength (980 nm) 412 emit a 33.3 kW beam of photons of the corresponding wavelength 413 which may then be combined with beam 411 using a wavelength filter 414. Wavelength filter 414 transmits 1020 and 1000 nm, but reflects the 980 nm beam, resulting in a three-wavelength beam 415 of 99.9 kW. Semiconductor lasers of a fourth wavelength (960 nm) 417 emit a 33.3 kW beam of photons of the corresponding wavelength 418 which may then be combined with beam 415 using a wavelength filter 416 that transmits 1020 nm, 1000 nm, and 980 nm photons, but reflects 960 nm, resulting in a four-wavelength beam 419 of 133.2 kW. This beam enters the optical imaging system with beam dimensions, for example, of 20 mm×20 mm and a divergence of 1.1 degrees at lenses 420. Lenses 420 may be a series of lenses that use two materials, C79-79 and ULE 7972, each having a different index of refraction, to cancel out the effect of wavelength variance on the ability to image the beam. The beam exits the optical system at 421, which may be a series of lenses that utilizes three materials, ZeruDur, ULE 7972, and C79-79 to cancel out the effect of wavelength variance on the ability to image the beam. The beam at 422 has been increased in intensity as a result of passing through the optical system and may now be 6 mm wide×6 mm tall at 3.67 degrees of divergence resulting in an intensity of 370 kW/cm², sufficient for the additive manufacturing processing of metals such as powdered stainless steel.

Proper selection of lens material may be necessary for best performance. Transmissive optics such as lenses 420 can be made with fused silica glass. This reduces thermal expansion problems due to extremely low coefficients of absorption at wavelengths near 1000 nm, and reduces thermal expansion of lenses due to the extremely low coefficients of thermal expansion fused silica. The use of fused silica allows for the optics to withstand much higher intensities without heating up and expanding which can lead to fracture, changes in the glass index of refraction, changes in glass shape, and consequent changes in focal points. Unwanted optical changes can also be reduced by use of two or more materials. Each material can have a different index of refraction which changes differently with wavelength. Used in the appropriate combination, the changes in index and optical path length cancel out, and there no variance in focal distance as a function of wavelength.

Figure 4B:
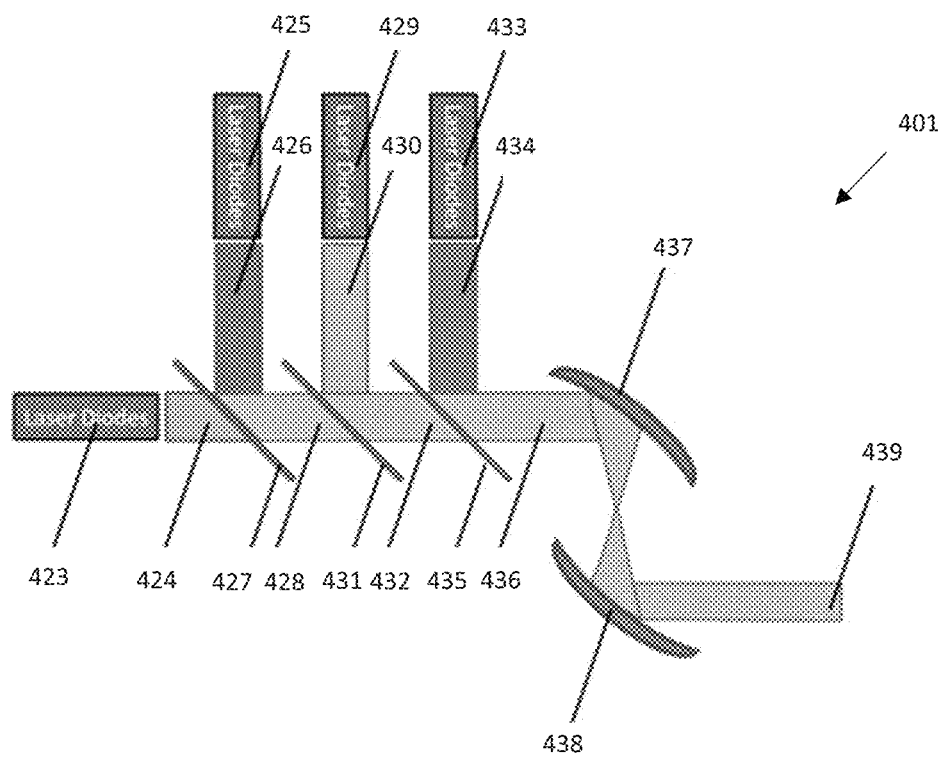

FIG. 4B illustrates an alternative beam combining system 401 that includes a combination of multiple wavelength semiconductor lasers and uses reflective imaging optics to reduce the foregoing discussed issues associated with transmissive optics. Like the beam combining system 400 of FIG. 4A, it will be understood, the discussed laser powers and wavelengths in system 401 are exemplary, as are the selected wavelengths reflected or transmitted by wavelength filters. With the appropriate changes in positioning and use of wavelength filters, greater or lesser numbers of lasers can be used. Multiple types of lasers can be used, and in one embodiment, recycling and reuse of rejected light can substitute for a laser. Rejected light available in an additive manufacturing system can be collected, homogenized and re-introduced into a beam line. Advantageously, reflective optics improve problems associated with semiconductor laser chirp (shift of wavelength over time) during startup transients and over their lifetime. The use of reflective optics prevents detuning of diode laser focus due to this effect and does not affect the resolution achieved or imaging capability. In addition, by using reflective optics, wavelength differences caused by variation in laser operating temperature do not affect the resolution or imaging capability.

In FIG. 4B, semiconductor lasers of a first wavelength (1020 nm) 423 emit a 33.3 kW beam of photons of the corresponding wavelength 424, semiconductor lasers of a second wavelength (1000 nm) 425 emit a 33.3 kW beam of photons of the corresponding wavelength 426. These beams may be combined using a wavelength filter 427 that transmits 1020 nm photons, but reflects 1000 nm photons, resulting may be a two-wavelength beam 428 of 66.6 kW. Semiconductor lasers of a third wavelength (980 nm) 429 emit a 33.3 kW beam of photons of the corresponding wavelength 430. These beams may be combined with beam 428 using a wavelength filter 431 which transmits 1020 and 1000 nm, but reflects 980 nm, resulting in a three-wavelength beam 432 of 99.9 kW. Semiconductor lasers of a fourth wavelength (960 nm) 433 emit a 33.3 kW beam of photons of the corresponding wavelength 434. These beams may be combined with beam 432 using a wavelength filter 435 that transmits 1020 nm, 1000 nm, and 980 nm photons, but reflects 960 nm, resulting in a four-wavelength beam 436 of 133.2 kW. This beam enters the optical imaging system with, for example, beam dimensions of 20 mm×20 mm and a divergence of 1.1 degrees at reflective optic 437. Reflective optics have no dependence on wavelength and do not affect the ability to image the beam. The beam exits the beam combining optical system 401 at reflective optic 438. The beam 439 has been increased in intensity as a result of passing through the optical system and may now ne 6 mm wide×6 mm tall at 3.67 degrees of divergence resulting in an intensity of 370 kW/cm², sufficient for the additive manufacturing processing of metals such as powdered stainless steel.

Figure 4C:
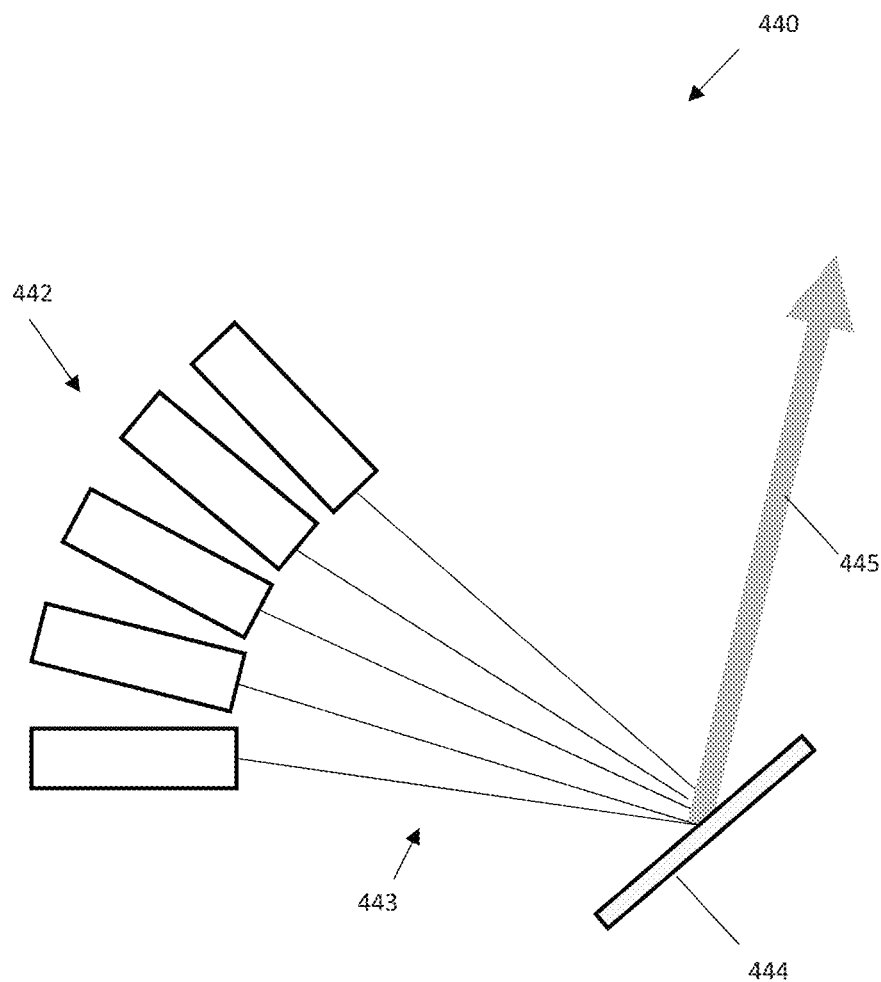

FIG. 4C illustrates an alternative embodiment of a beam combining system 440 that combines beams 443 from same or multiple wavelength lasers 442 using a diffractive imaging optic 444. The diffractive optic can be shaped or patterned to receive beams 443, and reflect them along a substantially same beam axis. As will be understood, while a diffractive optic that reflects beams is shown in FIG. 4C, in other embodiments the diffractive optic can transmit beams, or use a combination of reflective, transmissive, or other suitable beam steering optical assemblies or components.

Figure 5A:
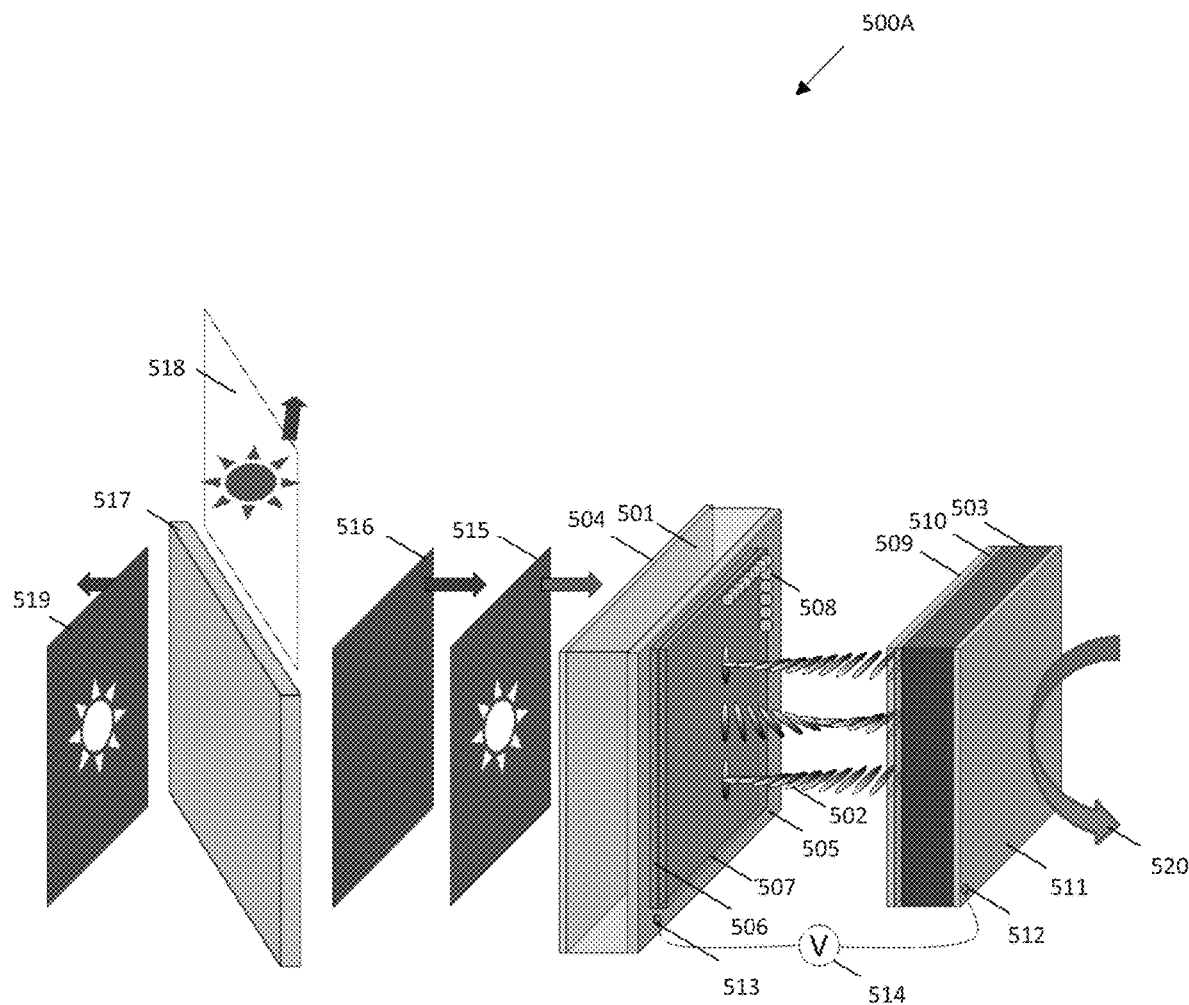
FIGS. 5A-B illustrate reflective light patterning unit embodiments.

FIG. 5A is a reflective optically addressed light valve system 500A useful in additive manufacturing systems such as disclosed herein. Reflective light valves do not need to transmit light through a transparent semiconductor for light patterning, where at high average power levels, even small amounts of absorption can cause unwanted and catastrophic heating. Reflective light valves can also allow for a greater ease of cooling on the reflective surface, with cooling on an opposing side to where the write beam and the read beam are incident.

As seen in FIG. 5A, the reflective optically addressed light valve system 500A may be capable of patterning an energy beam and may be composed of a highly transmissive layer 501, a twisted nematic (TN) liquid crystal layer 502, and a photoconductor layer 503. The highly transmissive layer may be optically transparent for 1000 nm and 700 nm light, made from glass substrate (C79-79 fused silica) 501 which has anti-reflective coatings on both sides at 504 and 506. An Indium Tin Oxide (ITO) conductive coating may be applied to highly transmissive layer 501 at 505. Layer 502 may be anchored to 506 and 510 by way of anchoring substrates 507 and 509. The exact spacing of 502 may be given by the size of the spacer balls 508 which define a gap of 2.5 microns, tuned for maximum contrast ratio when passing 1000 nm light in a double pass. Layer 503 may be made of a single crystalline silicon semiconductor with a high reflection dielectric coating applied at 510 which may be transparent to 700 nm, but reflective at 1000 nm. Layer 511 may be another layer of ITO which has a solder point attached 512 and may be connected to layer 505 by way of an AC voltage source 514 by way of another solder point 513. A patterned write beam of light may be emitted from a projector source at 700 nm and may be incident on 503 after transmitting through 504, 501, 505, 506, 507, 502, 509 and 510. Where the write beam strikes 503 electrons move from the valence band to the conduction band, greatly increasing the local electrical conductivity of 503, allowing current to flow from 511 through 503, 510, 509, 502, 507, and 506 to 505. As current flows through the TN liquid crystal 502, it induces rotation in the liquid crystal 502 causing polarization rotation in transmitted light. The "read" beam 516 may be p-polarized and may be incident on 510 after transmitting through 504, 501, 505, 506, 507, 502, and 509 at which point it reflects and transmits back through 509, 502, 507, 506, 505, 501, and 504 to exit the light valve system 500A. This beam may then be incident on a polarizer 517 which reflects s-polarization resulting in reflected beam 518 and transmits p-polarization resulting in transmitted beam 519. Even though absorption may be very low in the device the HR coating 509 is not perfectly reflecting and some energy may be absorbed. This energy may be removed by radiative, conductive, or convective cooling 520.

Figure 5B:
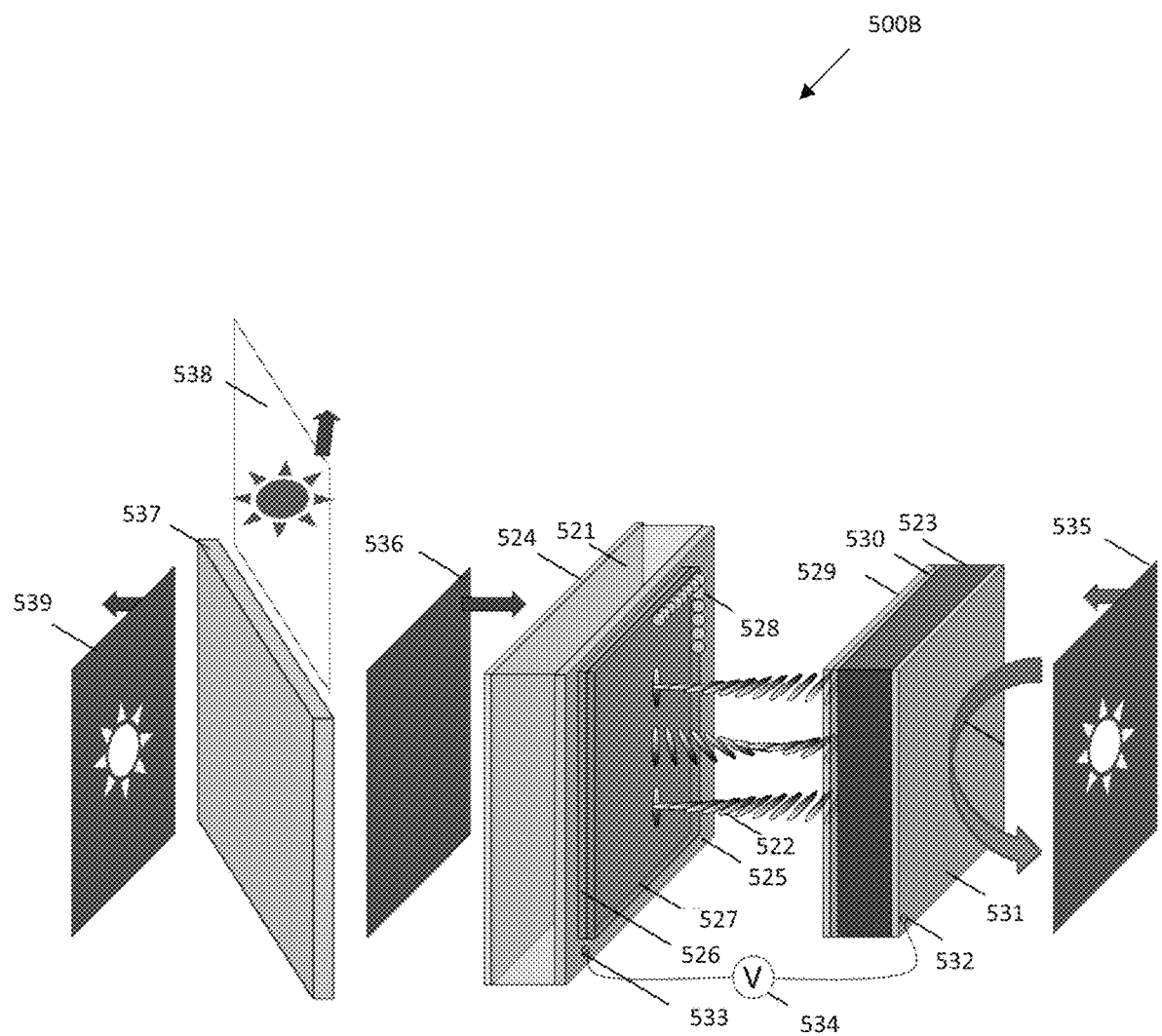

FIG. 5B illustrates an alternative reflective optically addressed light valve 500B with cooling on one side where the write beam and the read beam are incident from the different sides. The valve may be composed of a highly transmissive layer 521, a twisted nematic (TN) liquid crystal layer 522, and a photoconductor layer 523. The highly transmissive layer may be optically transparent for 1000 nm and 700 nm light, made from glass substrate (C79-79 fused silica) 521 which has anti-reflective coatings on both sides at 524 and 526. An Indium Tin Oxide (ITO) conductive coating may be applied to 521 at 525. Layer 522 may be anchored to 526 and 530 by way of anchoring substrates 527 and 259. The exact spacing of 522 may be given by the size of the spacer balls 528 which define a gap of 2.5 microns, tuned for maximum contrast ratio when passing 1000 nm light in a double pass. Layer 523 may be made of a single crystalline silicon semiconductor with a high reflection dielectric coating applied at 530 which reflective at 1000 nm. Layer 531 may be another layer of ITO which has a solder point attached 532 and may be connected to layer 525 by way of an AC voltage source 534 by way of another solder point 533. A patterned write beam of light may be emitted from a projector source at 700 nm and may be incident on 523 after transmitting through an optional convective/conductive substrate 540 and through the ITO coating 531. Where the write beam strikes 503 electrons move from the valence band to the conduction band, greatly increasing the local electrical conductivity of 523, allowing current to flow from 531 through 523, 530, 529, 522, 527, and 526 to 525. As current flows through the TN liquid crystal 522, it induces rotation in the liquid crystal 522 causing polarization rotation in transmitted light. The "read" beam 536 may be p-polarized and may be incident on 530 after transmitting through 524, 521, 525, 526, 527, 522, and 529 at which point it reflects and transmits back through 529, 522, 527, 526, 525, 521, and 524 to exit the light valve. This beam may then be incident on a polarizer 537 which reflects s-polarization resulting in reflected beam 538 and transmits p-polarization resulting in transmitted beam 539. Even though absorption may be very low in the device the HR coating 529 is not perfectly reflecting and some energy may be absorbed. This energy may be removed by radiative, conductive, or convective cooling 540.

Figure 5C:
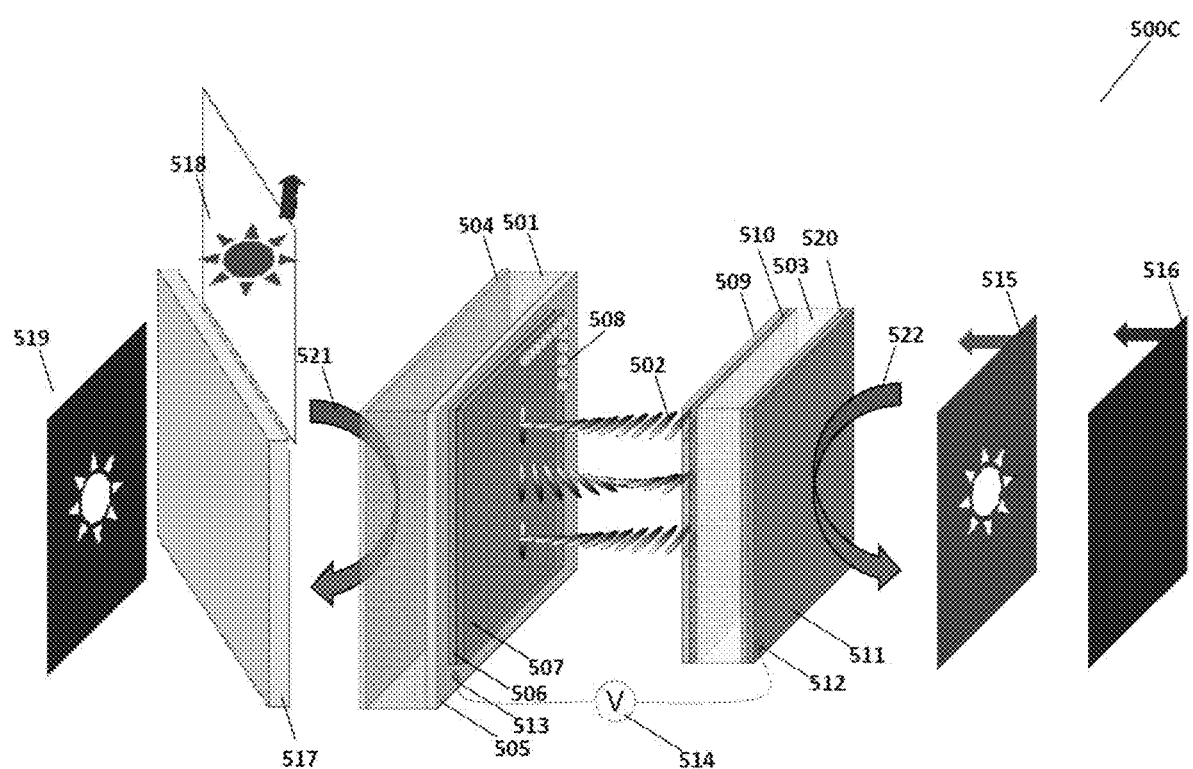
FIG. 5C illustrates one embodiment of a transmissive light patterning unit.

As seen in FIG. 5C, a transmissive optically addressed light valve system 500C may be capable of patterning an energy beam and may be composed of a highly transmissive layer 501, a twisted nematic (TN) liquid crystal layer 502, and a photoconductor layer 503. The highly transmissive layer may be optically transparent for 1000 nm and 700 nm light, made from glass substrate (C79-79 fused silica) 501 which has anti-reflective coatings on both sides at 504 and 506. An Indium Tin Oxide (ITO) conductive coating may be applied to highly transmissive layer 501 at 505. Layer 502 may be anchored to 506 and 510 by way of anchoring substrates 507 and 509. The exact spacing of 502 may be given by the size of the spacer balls 508 which define a gap of 5 microns, tuned for maximum contrast ratio when passing 1000 nm light in a single pass. Layer 503 may be made of a single crystalline Bismuth Silicon Oxide semiconductor with a anti-reflection dielectric coating applied on both sides at 510 and at 520. Layer 511 may be another layer of ITO which has a solder point attached 512 and may be connected to layer 505 by way of an AC voltage source 514 by way of another solder point 513. A patterned write beam of light may be emitted from a projector source at 450 nm and may be incident on 503 after transmitting through 511 and 520. Where the write beam strikes 503 electrons move from the valence band to the conduction band, greatly increasing the local electrical conductivity of 503, allowing current to flow from 511 through 520, 503, 510, 509, 502, 507, and 506 to 505. As current flows through the TN liquid crystal 502, it induces rotation in the liquid crystal 502 causing polarization rotation in transmitted light. The "read" beam 516 may be p-polarized and may transmit through 511, 520, 503, 510, 509, 502, 507, 506, 505, 501, and 504 to exit the light valve system 500C. This beam may then be incident on a polarizer 517 which reflects s-polarization resulting in reflected beam 518 and transmits p-polarization resulting in transmitted beam 519. Even though absorption may be very low in the device, due to imperfections in the materials and coatings some energy may be absorbed. This energy may be removed by radiative, conductive, or convective cooling 521 and 522. If convective, the cooling is removed by a fluid that is extremely transparent to both 1000 nm light and 450 nm light.

Referring to FIGS. 6-13, there are many states of matter that require energetic transitions. Accordingly, these states of matter may typically only be reached or achieved with relatively large inputs of energy. The energy necessary to achieve one or these states may be or comprise an appropriate combination of pressure and temperature. In general, the greater the pressure, the lower the temperature necessary to achieve one of these states of matter. Conversely, the lower the pressure, the higher the temperature necessary to achieve one of these states of matter.

The various crystallographic states of steel (e.g., austenitic, ferritic, martensitic, pearlite, cementite, etc.) may be examples of states of matter that require energetic transitions. Other examples may be one or more substances made of elemental carbon. For example, carbon may exist in various forms and different states of carbon are being continuously discovered. Such states may include graphite, q-carbon, diamond (e.g., synthetic diamond), etc.

Technical ceramics provide further examples of interesting states of matter that may require energetic transitions. Certain such ceramics have material properties not found elsewhere in the known material world. For example, among numerous other benefits, silicon carbide (SiC) is incredibly hard and heat resistant.

In selected embodiments, one or more systems set forth hereinabove or a system comprising one or more components or features set forth hereinabove may support, enable, or provide the energy necessary to obtain or reach one or more states of matter requiring energetic transitions. For example, as set forth hereinabove, a system comprising a dynamic mask may selectively amalgamate a powdered material 144 to additively form one or more three-dimensional objects. In selected embodiments, such a system mask may also provide one or more short, high intensity pulses to transition an amalgamated material from one state to another state. That is, the system may fuse materials having chemical energy barriers to the liquid state or that require high energy, dynamic processes to undergo the required steps of melting, consolidation, and re-solidification in their original form or into a new state of matter. In addition to obtaining a desired state of matter in a single layer, the system may also obtain a desired state of matter for layer upon layer and the interfaces therebetween. Thus, all or selected portions of the resulting component may be pushed toward a desired state of matter therefor.

Figure 6:
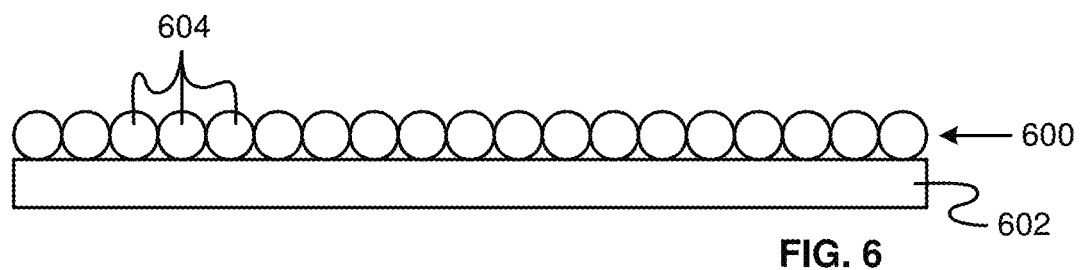
FIG. 6 is a schematic diagram of a first layer of granules distributed across a substrate.

In an additive manufacturing process, a layer 600 of powdered material 144 may be deposited on a substrate 602 (e.g., a print bed 146, some material that will form part of the completed component, or the like). The layer 600 may typically be a few particles thick. For example, FIG. 6 illustrates a substrate 602 with a layer 600 of powdered material 144 (e.g., material comprising a plurality of particles 604 or granules 604) distributed thereacross in preparation for an additive manufacturing process.

Figure 7:
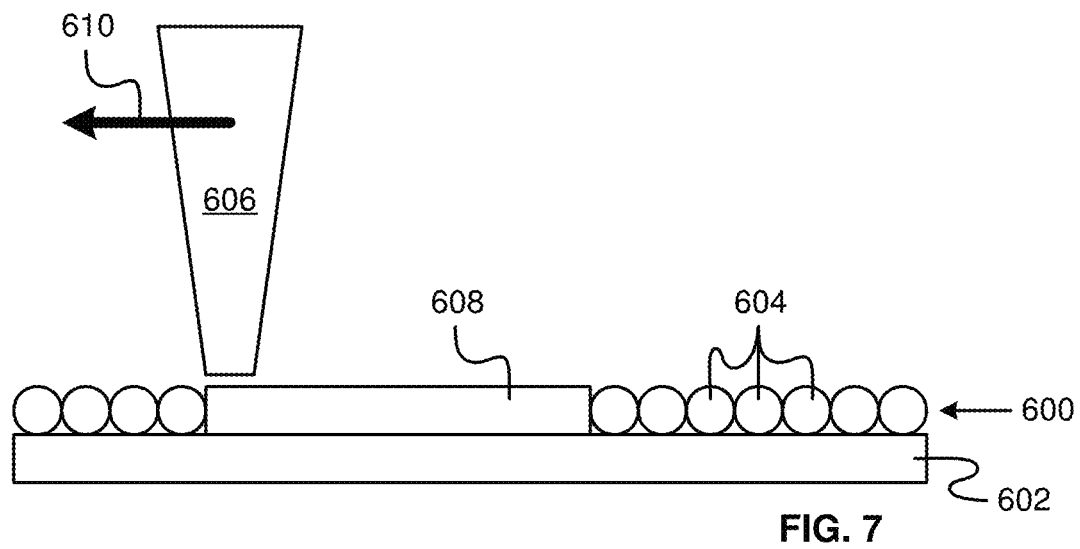
FIG. 7 is a schematic diagram of a laser beam sweeping over the first layer of FIG. 6 to amalgamate a selected portion of the granules thereof.

To create desired components, a laser beam 606 may amalgamate (e.g., melt) a desired portion of the layer 600 and the interface between the desired portion of the layer 600 and the substrate 602. In selected embodiments, once the interface and the granules 604 corresponding to the desired portion have been sufficiently heated (e.g., completely or partially melted), surface tension may rapidly pull the molten material together to form an amalgamated layer 608. For example, FIG. 7 illustrates a laser beam 606 that has been swept 610 (e.g., rastered) over a desired portion of a layer 600 of powdered material 144 and formed in that desired portion an amalgamated layer 608. In such a system or process, the laser being swept 610 may be either spatially modulated to achieve desired temporal pulse characteristics, or a second laser may follow it its wake.

Figure 8:
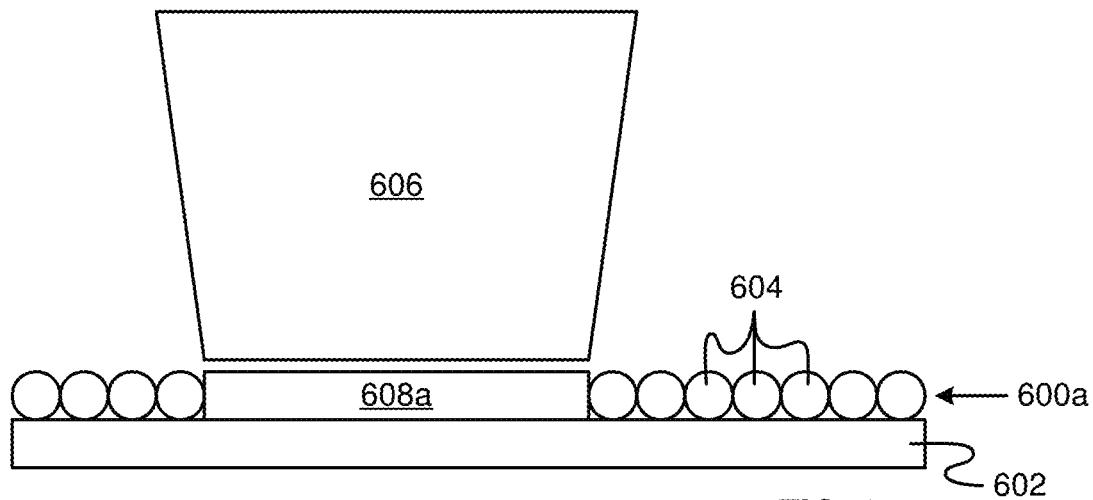
FIG. 8 is a schematic diagram of a laser beam area printing on the first layer of FIG. 6 to amalgamate a selected portion of the granules thereof.
Figure 9:
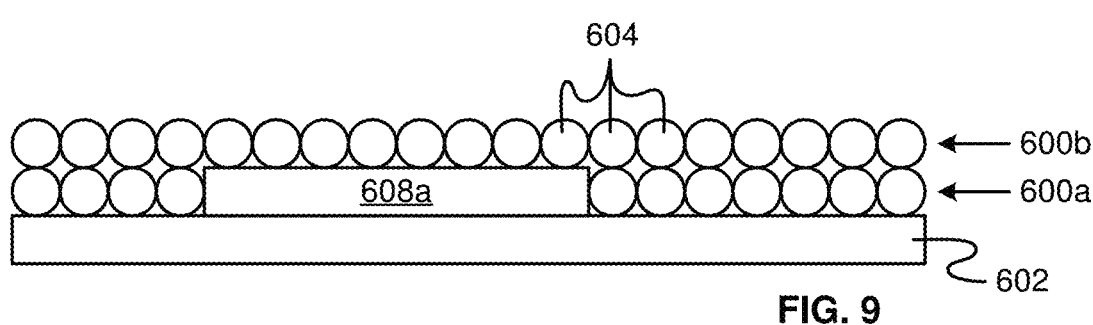
FIG. 9 is a schematic diagram of a second layer of granules distributed across the first layer of FIG. 6, wherein a portion of the granules of the first layer have been amalgamated and form a substrate for the second layer.
Figure 10:
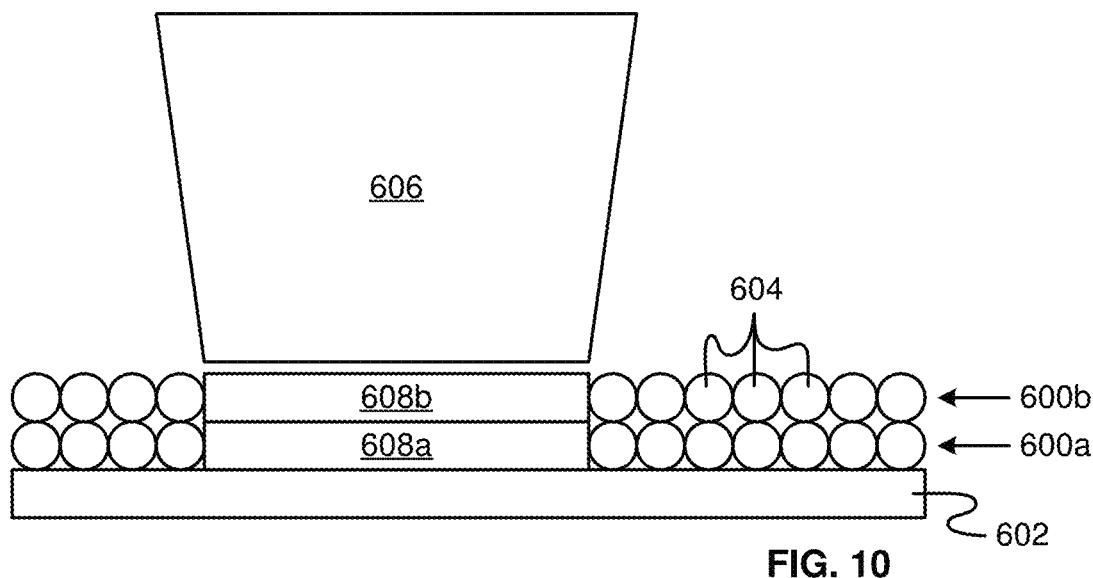
FIG. 10 is a schematic diagram of a laser beam area printing on the second layer of FIG. 9 to amalgamate a selected portion of the granules thereof.

Alternatively, amalgamation may occur in more of a batch process wherein a certain two dimension area is printed at one time. For example, FIG. 8 illustrates a relatively wide laser beam 606 that may be sub-patterned in accordance with the present disclosure to provide higher resolution printing. This wider laser beam 606 may amalgamate desired sections of a first layer 600*a* of a powdered material 144 spread across a substrate 602. This may form a first amalgamated layer 608*a* of a desired component. Thereafter, as shown in FIG. 9, a second layer 600*b* of powdered material 144 may be spread over the first layer 600*a* and the first amalgamated layer 608*a*. The first layer 600*a* (e.g., the amalgamated portion 608*a* of the first layer 600*a*) may form a substrate for the second layer 600*b*. Accordingly, the wider laser beam 606 may amalgamate desired portions of the second layer 600*b* of the powdered material 144 to form a second amalgamated layer 608*b* of the desired component. This process may be repeated until the desired component is complete.

In selected embodiments, one or more systems set forth hereinabove or a system comprising one or more components or features set forth hereinabove may apply energy (e.g., radiant energy) at different levels at different times. The different levels and times may be selected to enable, support, or provide the desired amalgamation and the desired state of matter. Accordingly, high intensity short pulse lasers may be used to effect more than a phase change in a material being printed. That is, one or more laser beams may be used to amalgamate granules 604 and to obtain a desired state for the material thereof after amalgamation.

For example, materials such as silicon carbide, tungsten carbide, and the like may dissociate upon heating, typically with one component (e.g., silicon, tungsten, or the like) molten and the other (e.g., carbon) solid. Accordingly, in certain embodiments, in a first heating process (e.g., a process associated with delivery of first radiant energy), a system in accordance with the present invention may apply sufficient energy to bring one component (e.g., silicon, tungsten, or the like) to a molten state. Thereafter, a second heating process (e.g., a process associated with delivery of second radiant energy), comprised of a system in accordance with the present invention may apply sufficient energy to bring another component (e.g., carbon) to a molten state, or supply the appropriate activation energy to overcome the phase transition. Accordingly, by applying sufficient energy at appropriate times, all components may be brought to a fully molten state.

This may allow for proper flow and avoid segregation of the elements in the semi-solid phase. To bring both metal and carbon components to a fully molten state, significant thermo-chemical energy barriers relating to dissociation and subsequent phase change need to be overcome. Furthermore, once initiated, such a process needs to proceed rapidly relative to elemental diffusion rates within the semisolid particulates. Accordingly, a system in accordance with the present invention may provide sufficient energy to overcome such barriers in a short period of time.

The thermo-chemical energy barriers (e.g., activation energy barriers) corresponding to different materials may be overcome in difference ways. That is, transitioning graphite to diamond and/or q-carbon, or the like may involve different processes than those involved in printing or forming silicon carbide, tungsten carbide, or the like in an additive manufacturing process. For example, in one or more carbon-based processes, after spreading the powder on the surface, the process may proceed either in a high pressure environment, using an energy source such as a laser or electron beam for heating, or by using the pressure generated by the energy source interacting with the substrate along with the thermal energy deposition to perform an amalgamation process (e.g., the process of melting and/or bonding the particles to themselves, other particles, and/or to the substrate). Thereafter, while still at high temperature, an energy source may then be used to pulse the amalgamated material with additional energy in one or more very short bursts such that the proper chemical bonds can be formed therein. In the case of transitioning graphite to q-carbon and/or diamond, the additional energy may transition "sp2" bonds to "sp3" bonds.

To achieve these secondary or high energy effects, a q-switched pulsed laser (i.e., a laser with modulation of the quality-factor in the laser cavity) may used to overcome the dynamic nature of chemical bond creation by delivering one or more pulses with a duration in the range from about 1 nanosecond to about 1 microsecond. Furthermore, the purely thermal and heat management components of the pulse (e.g., the heating corresponding to an initial amalgamation) may be delivered over longer time scales (e.g., periods of time in the range of about 1 microsecond to about 1 millisecond) by more cost-effective lasers (e.g., an diode laser array). By combining a q-switched pulse laser with a much lower cost diode laser array, a highly economic method for achieving the proper phase-change, temporal flux profiles may be obtained. That is, a system in accordance with the present invention may be set up in a pulse by pulse arrangement such that the laser may use multiple intensity components to create a desired or required temporal pulse (e.g., power flux profile with respect to time) in the same beamline.

Laser pulses in accordance with the present invention may be temporally shaped (e.g., power flux may vary with time). Alternatively, or in addition thereto, spatial shaping (e.g., varying power flux with "x" and "y" spatial components) of these pulses may allow for high resolution and high throughput additive manufacturing of 3-D printed articles. Patterning these lasers with a mask (e.g., light valve) as set forth hereinabove may enable, support, or provide additive manufacturing processes involving what may be considered "exotic" (e.g., previously unusable) materials.

Figure 11:
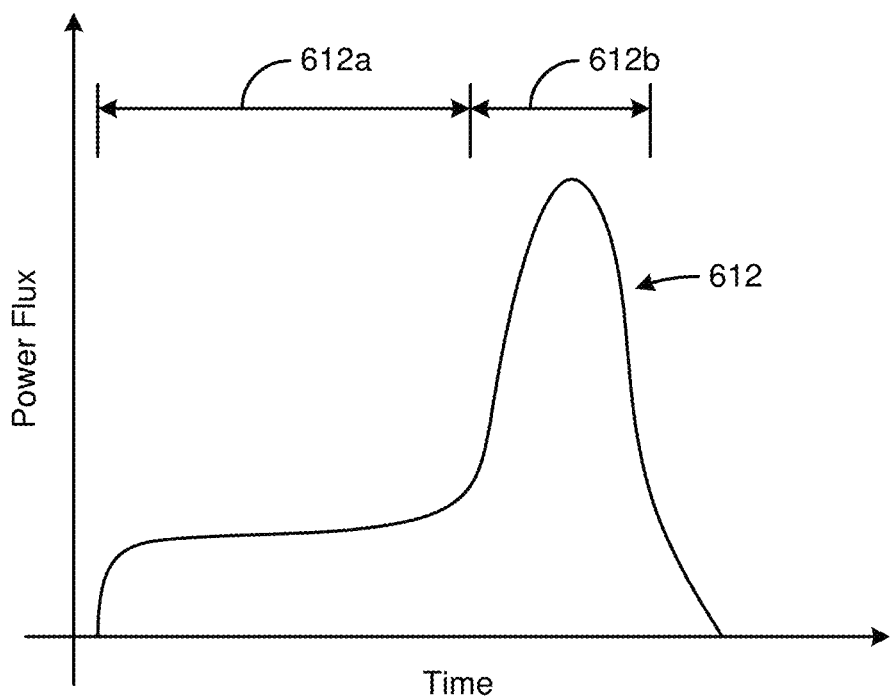
FIG. 11 is a power flux versus time profile of one embodiment of heating method in accordance with the present invention.

FIG. 11 illustrates an example of a power flux profile 612 with respect to time. This particular profile 612 may be tailored to overcome a single chemical barrier in a process that requires fast cooling rates. The profile 612 may represent the power flux applied to the material forming the component that is being manufactured. The profile 612 may be composed of a relatively low intensity (on the order of hundreds of watts per square centimeter to tens of kilowatts per square centimeter) portion 612a wherein energy (e.g., radiant energy) may be provided by more cost-effective lasers (e.g., a diode laser array). A later, relatively high intensity (on the order of hundreds of kilowatts per square centimeter to tens of gigawatts per square centimeter) portion 612b may provide the energy necessary to enable or support a fast acting, high-energy-requirement chemical reaction such as the phase change energy when melting silicon carbide, tungsten carbide, or the like.

In selected embodiments, a profile 612 as illustrated in FIG. 11 may be used to convert a carbon material to a desired state. For example, rapidly quenched carbon (or q-carbon) that is heated by a high energy laser quickly and then allowed to rapidly cool may begin to convert graphitic bonds (i.e., sp2 bonds) to diamond bonds (i.e., sp3 bonds). Repeated processing (e.g., repeatedly applying the profile 612 of FIG. 11) may fully convert graphite to synthetic diamond without the extreme pressures or environment typically required to create diamond structures.

In certain embodiments, a profile 612 as illustrated in FIG. 11 may be used to convert a granule ceramic material (e.g., granular silicon carbide, granular tungsten carbide, or the like) to a 3D printed ceramic shape. For example, a lower energy portion 612a of a profile 612 may liquefy a first component (e.g., silicon, tungsten). Thereafter, a higher energy portion 612b may liquefy a second component (e.g., carbon) so that a ceramic in the printed shape may be generated. Alternatively, a higher energy portion 612b of a profile 612 may liquefy a first component (e.g., silicon, tungsten). Thereafter, repeated processing (e.g., repeating the profile 612 of FIG. 11 or at least providing another high energy portion 612b) may liquefy a second component (e.g., carbon) so that a ceramic in the printed shape may be generated.

Figure 12:
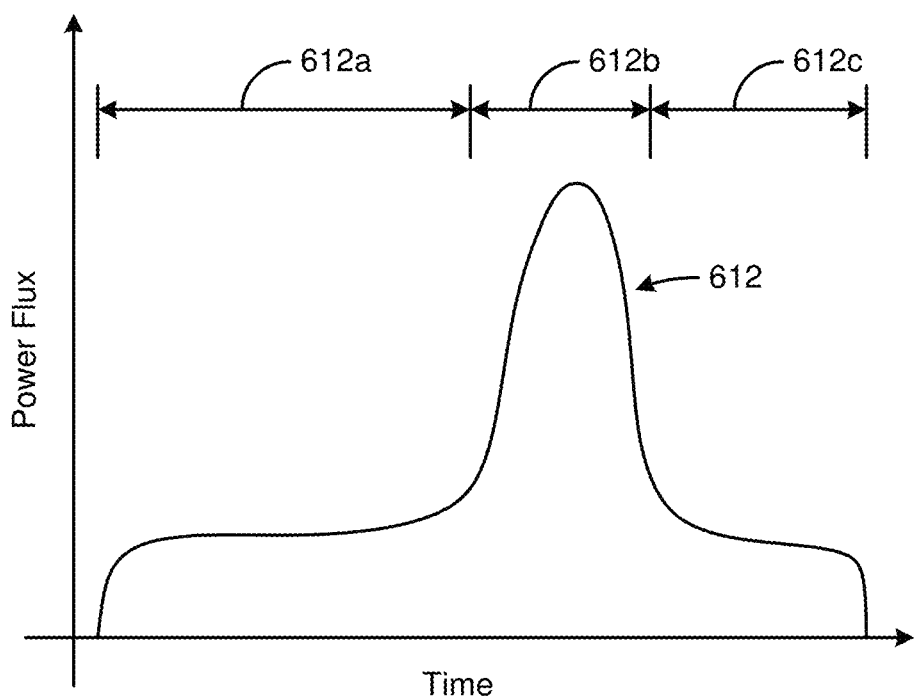
FIG. 12 is a power flux versus time profile of another embodiment of heating method in accordance with the present invention.

FIG. 12 illustrates another example of a power flux profile 612 with respect to time. This particular profile 612 may be tailored to overcome a single chemical barrier in a process that requires slow or controlled cooling rates. The profile 612 may represent the power flux applied to the material forming the component that is being manufactured. The profile 612 may be composed of a lower intensity portion 612a that allows for more cost effective lasers to be used. A later higher intensity portion 612b may provide the energy necessary to enable or support a fast acting, high-energy-requirement chemical reaction. After the material is melted and bonded, a controlled portion 612c for managing the rate of heat loss may be applied (e.g., to prevent material fracture from the naturally fast cooling rates in brittle materials such as in tungsten or silicon carbide).

Figure 13:
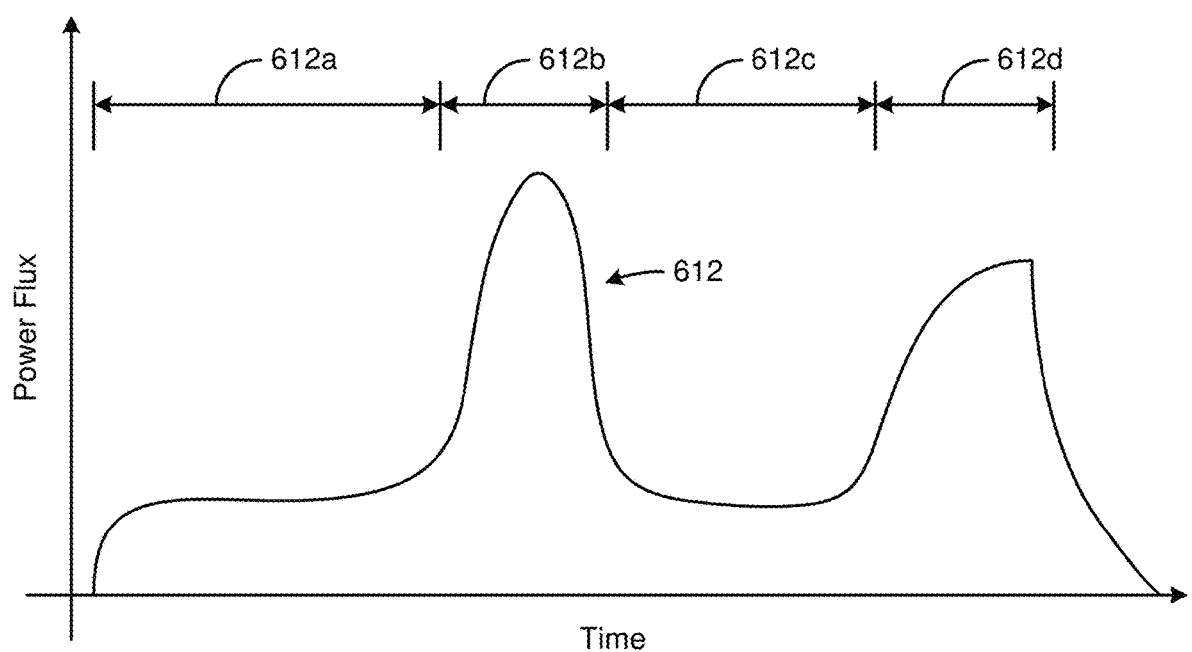
FIG. 13 is a power flux versus time profile of another embodiment of heating method in accordance with the present invention.

FIG. 13 illustrates another example of a power flux profile 612 with respect to time. This particular profile 612 may be tailored to overcome a double chemical barrier in a process that requires slow cooling, or controlled temperatures between thermo-chemical barriers. The profile 612 may represent the power flux applied to the material forming the component that is being manufactured. The profile 612 may be composed of a low intensity portion 612a allowing more cost effective lasers to be used. A later higher intensity portion 612b may provide the energy necessary to enable a fast acting, high-energy-requirement chemical reaction. After the material is melted and bonded, a controlled portion 612c may be used to manage the rate of heat loss and may be applied to prevent material fracture from the naturally fast cooling rates in brittle materials. Alternatively, or in addition thereto, the controlled portion 612c may be applied to continue a heating process until a next higher intensity portion 612*d* is applied, which may enable further chemistry at high temperatures.

An example of the invention may include one or more of the following steps, functions, or structures:

distributing a layer of a material over a substrate;

directing first radiant energy at a first portion of the layer;

amalgamating, by the first radiant energy, the first portion with the substrate; and overcoming, after the amalgamating, an activation energy barrier corresponding to the first portion by directing second radiant energy thereat.

The example of the invention may also include one or more steps, functions, or structures set forth above combined with the material comprising at least two chemical reactants.

The example of the invention may also include one or more steps, functions, or structures set forth above combined with overcoming, after the amalgamating, the activation energy barrier of a reaction between the at least two chemical reactants corresponding to the first portion by directing second radiant energy thereat.

The example of the invention may also include one or more steps, functions, or structures set forth above combined with a first chemical reactant of the at least two chemical reactants comprising a first carbon atom.

The example of the invention may also include one or more steps, functions, or structures set forth above combined with a second chemical reactant of the at least two chemical reactants comprising a second carbon atom.

The example of the invention may also include one or more steps, functions, or structures set forth above combined with the activation energy barrier corresponding to a bond between the first and second carbon atoms.

The example of the invention may also include one or more steps, functions, or structures set forth above combined with the material comprising carbon.

The example of the invention may also include one or more steps, functions, or structures set forth above combined with the amalgamating the first portion with the substrate comprising forming a graphite structure.

The example of the invention may also include one or more steps, functions, or structures set forth above combined with the overcoming the activation energy barrier comprises converting at least a portion of the graphite structure to q-carbon or synthetic diamond.

The example of the invention may also include one or more steps, functions, or structures set forth above combined with the material comprises silicon carbide or tungsten carbide.

The example of the invention may also include one or more steps, functions, or structures set forth above combined with the amalgamating the first portion with the substrate comprises liquefying silicon or tungsten within the first portion.

The example of the invention may also include one or more steps, functions, or structures set forth above combined with the overcoming the activation energy barrier comprises liquefying carbon within the first portion.

The example of the invention may also include one or more steps, functions, or structures set forth above combined with the second radiant energy being greater than the first radiant energy.

The example of the invention may also include one or more steps, functions, or structures set forth above combined with the layer comprising at least one of a filament of the material and granules of the material.

The example of the invention may also include one or more steps, functions, or structures set forth above combined with the substrate being formed of the material.

The example of the invention may also include one or more steps, functions, or structures set forth above combined with directing the first radiant energy at the first portion occurs for a first period of time.

The example of the invention may also include one or more steps, functions, or structures set forth above combined with directing the second radiant energy at the first portion occurs for a second period of time.

The example of the invention may also include one or more steps, functions, or structures set forth above combined with the first period of time being at least an order of magnitude greater than the second period of time.

The example of the invention may also include one or more steps, functions, or structures set forth above combined with the first period of time being on the order of microsecond to millisecond.

The example of the invention may also include one or more steps, functions, or structures set forth above combined with the second period of time being on the order of nanosecond to microsecond.

The example of the invention may also include one or more steps, functions, or structures set forth above combined with the first period of time being within a range from about 1 microsecond to about 1 millisecond.

The example of the invention may also include one or more steps, functions, or structures set forth above combined with the second period of time being within a range from about 1 nanosecond to about 1 microsecond.

The example of the invention may also include one or more steps, functions, or structures set forth above combined with generating, by a diode array, the first radiant energy.

The example of the invention may also include one or more steps, functions, or structures set forth above combined with generating, by a diode array, the first radiant energy at a power flux on the order of about hundreds of watts per square centimeter to about tens of kilowatts per square centimeter.

The example of the invention may also include one or more steps, functions, or structures set forth above combined with generating, by a q-switched pulsed laser, the second radiant energy.

The example of the invention may also include one or more steps, functions, or structures set forth above combined with generating, by a q-switched pulsed laser, the second radiant energy at a power flux on the order of about hundreds of kilowatts per square centimeter to about tens of gigawatts per square centimeter.

The example of the invention may also include one or more steps, functions, or structures set forth above combined with generating, by a first device, the first radiant energy as an electron beam or a laser beam.

The example of the invention may also include one or more steps, functions, or structures set forth above combined with generating, by a second device, the second radiant energy as an electron beam or a laser beam.

The example of the invention may also include one or more steps, functions, or structures set forth above combined with changing comprising altering a preponderance of covalent chemical bonds within the first portion.

The example of the invention may also include one or more steps, functions, or structures set forth above combined with changing comprising altering a preponderance of ionic chemical bonds within the first portion.

The example of the invention may also include one or more steps, functions, or structures set forth above combined with changing comprising altering a preponderance of metallic chemical bonds within the first portion.

The example of the invention may also include one or more steps, functions, or structures set forth above combined with at least one of the directing the first radiant energy and the directing the second radiant energy comprising directing co-linear laser beams that sequentially target the first portion.

The example of the invention may also include one or more steps, functions, or structures set forth above combined with at least one of the directing the first radiant energy and the directing the second radiant energy comprising directing a plurality of non-co-linear laser beams that sequentially target the first portion.

The example of the invention may also include one or more steps, functions, or structures set forth above combined with passing at least one of the first radiant energy and the second radiant energy through at least one light valve.

The example of the invention may also include one or more steps, functions, or structures set forth above combined with patterning the at least one of the first radiant energy and the second radiant energy onto the layer while controlling a temporal pulse shape thereof and rejecting undesired radiant energy.

Another example of the invention may include one or more of the following steps, functions, or structures:
- a print bed supporting a layer of a material;
- at least one source generating radiant energy;
- a mask;
- a computer system controlling the masking produced by the mask; and
- the computer system comprising at least one processor and memory operably connected to the at least one processor, the memory storing software programmed to (1) amalgamate a first portion of the layer and (2) overcome, after the amalgamating, an activation energy barrier of the material of the first portion.

The example of the invention may also include one or more steps, functions, or structures set forth above combined with the at least one source generating first radiant energy and second radiant energy.

The example of the invention may also include one or more steps, functions, or structures set forth above combined with the memory further storing software programmed to control the mask to let the first radiant energy reach the first portion at an intensity sufficient to amalgamate the material that corresponds to the first portion to a substrate.

The example of the invention may also include one or more steps, functions, or structures set forth above combined with the material comprising at least two chemical reactants.

The example of the invention may also include one or more steps, functions, or structures set forth above combined with the memory further storing software programmed to control the mask to overcome, after the amalgamating, the activation energy barrier of a reaction between the at least two chemical reactants corresponding to the first portion by directing the second radiant energy thereat.

The example of the invention may also include one or more steps, functions, or structures set forth above combined with directing the first radiant energy at the first portion occurs for a first period of time.

The example of the invention may also include one or more steps, functions, or structures set forth above combined with directing the second radiant energy at the first portion occurs for a second period of time.

The example of the invention may also include one or more steps, functions, or structures set forth above combined with the first period of time being on the order of microsecond to millisecond.

The example of the invention may also include one or more steps, functions, or structures set forth above combined with the second period of time being on the order of nanosecond to microsecond.

The example of the invention may also include one or more steps, functions, or structures set forth above combined with the first period of time being within a range from about 1 microsecond to about 1 millisecond.

The example of the invention may also include one or more steps, functions, or structures set forth above combined with the second period of time being within a range from about 1 nanosecond to about 1 microsecond.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. An apparatus, comprising:
    a print bed configured to support a layer of a material comprising at least two chemical elements chemically bonded together;
    at least one energy source configured to generate first radiant energy and second radiant energy, the second radiant energy having an intensity greater than an intensity of the first radiant energy and a duration shorter than a duration of the first radiant energy;
    a mask; and
    a computer system configured to control the print bed, the at least one source and the mask, the computer system comprising a processor and a memory operably connected to the at least one processor, the processor is configured to execute instructions stored in the memory to perform operations comprising:
        distributing a first layer of the material over a substrate;
        directing the first radiant energy at a first portion of the first layer to heat the first portion;

after heating the first portion, directing the second radiant energy at the first portion to overcome an activation energy barrier of a reaction between the two chemical elements corresponding to the first portion such that, as a result of the overcoming, additional chemical bonds form between the two chemical elements corresponding to the first portion; and distributing, after the forming, a second layer of the material over the first layer.

2. The apparatus of claim 1, wherein the material comprises a ceramic in a granular form.

3. The apparatus of claim 2, wherein the forming converts the ceramic to a solid in a non-granular form.

4. The apparatus of claim 1, wherein:
the directing the first radiant energy at the first portion occurs for a first period of time;
the directing the second radiant energy at the first portion occurs for a second period of time; and
the first period of time is at least an order of magnitude greater than the second period of time.

5. The apparatus of claim 4, wherein the first period of time is within a range from about 1 microsecond to about 1 millisecond and the second period of time is within a range from about 1 nanoseconds to about 1 microsecond.

6. The apparatus of claim 1, wherein the processor is further configured to perform operations comprising:
controlling a solid-state pulsed laser of the at least one energy source to generate at least a portion of the second radiant energy.

7. The apparatus of claim 1, wherein the processor is further configured to perform operations comprising:
controlling a solid-state pulsed laser of the at least one energy source to generate at least a portion of the second radiant energy.

8. The apparatus of claim 1, wherein the first radiant energy comprises an electron beam or a laser beam.

9. The apparatus of claim 1, wherein the second radiant energy comprises an electron beam or a laser beam.

10. The apparatus of claim 1, wherein the overcoming comprises altering a preponderance of covalent chemical bonds within the first portion.

11. The apparatus of claim 1, wherein the overcoming comprises altering a preponderance of ionic chemical bonds within the first portion.

12. The apparatus of claim 1, wherein the overcoming comprises altering a preponderance of metallic chemical bonds within the first portion.

13. The apparatus of claim 1, wherein at least one of the directing the first radiant energy and the directing the second radiant energy comprises directing co-linear laser beams that sequentially target the first portion.

14. The apparatus of claim 1, wherein at least one of the directing the first radiant energy and the directing the second radiant energy comprises directing a plurality of non-co-linear laser beams that sequentially target the first portion.

15. The apparatus of claim 1, further comprising:
an energy patterning unit,
wherein at least one of the first radiant energy and the second radiant energy passes through at least one light valve of the energy patterning unit to result in patterning of the at least one of the first radiant energy and the second radiant energy onto the first layer by controlling a temporal pulse shape of the at least one of the first radiant energy and the second radiant energy and rejecting unused radiant energy.

* * * * *